(12) United States Patent
Kageyama et al.

(10) Patent No.: US 7,517,006 B2
(45) Date of Patent: Apr. 14, 2009

(54) FRONT STRUCTURE OF AUTOMOTIVE VEHICLE

(75) Inventors: Yasunori Kageyama, Hiroshima (JP); Takayuki Nakamae, Hiroshima (JP); Hiroshi Sogabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/649,262

(22) Filed: Jan. 4, 2007

(65) Prior Publication Data

US 2007/0182171 A1 Aug. 9, 2007

(30) Foreign Application Priority Data

Jan. 31, 2006 (JP) ............... 2006-021995
Jan. 31, 2006 (JP) ............... 2006-021996

(51) Int. Cl.
*B60J 7/00* (2006.01)
(52) U.S. Cl. ............................... 296/187.09
(58) Field of Classification Search ......... 296/187.09, 296/287.01; 293/133, 132, 120
See application file for complete search history.

(56) References Cited

U.S. PATENT DOCUMENTS

| | | | | |
|---|---|---|---|---|
| 5,066,057 A * | 11/1991 | Furuta et al. | ................ | 293/121 |
| 6,634,702 B1 * | 10/2003 | Pleschke et al. | ........ | 296/187.08 |
| 6,676,179 B2 * | 1/2004 | Sato et al. | ................... | 293/121 |
| 6,886,872 B2 * | 5/2005 | Matsumoto et al. | ......... | 293/120 |
| 6,893,064 B2 * | 5/2005 | Satou | ................... | 296/187.09 |
| 6,997,490 B2 * | 2/2006 | Evans et al. | ............ | 296/187.09 |
| 7,044,246 B2 * | 5/2006 | Fujieda | ................. | 296/187.09 |
| 7,325,861 B2 * | 2/2008 | Zacheiss et al. | ........ | 296/187.09 |
| 7,354,082 B2 * | 4/2008 | Sakamoto et al. | ........... | 293/115 |
| 2005/0017520 A1 * | 1/2005 | Evans et al. | ................. | 293/120 |
| 2005/0248164 A1 * | 11/2005 | Kimura et al. | .............. | 293/120 |
| 2007/0216198 A1 * | 9/2007 | Nakamae et al. | ....... | 296/193.09 |
| 2008/0067838 A1 * | 3/2008 | Nakamae et al. | ....... | 296/203.02 |

FOREIGN PATENT DOCUMENTS

| | | |
|---|---|---|
| EP | 1065108 | 1/2001 |
| EP | 1072476 | 1/2001 |
| EP | 1138557 | 10/2001 |
| EP | 1241080 | 9/2002 |

(Continued)

OTHER PUBLICATIONS

European Search Report, EP 07001051, Dated Mar. 15, 2007.

*Primary Examiner*—Kiran B. Patel
(74) *Attorney, Agent, or Firm*—Studebaker & Brackett PC; Donald R. Studebaker

(57) ABSTRACT

A bumper face is comprised of an upper portion and a lower portion. An opening portion is formed between the upper and lower portions. A bumper mesh is comprised of a mesh body located at the opening portion and a bumper face lower reinforcing portion that is located inside of the lower portion of the bumper face and connected to a lower end of the lower portion. The bumper mesh includes an extension portion that extends rearward from a lower end of the bumper face lower reinforcing portion and is connected to the lower portion of the shroud. Accordingly, the rearward movement of the bumper face lower reinforcing portion can be surely prevented, without increasing the number of parts, and thereby the prevention of dragging of a pedestrian can be improved.

13 Claims, 21 Drawing Sheets

| FOREIGN PATENT DOCUMENTS | | |
|---|---|---|
| EP | 2004/203183 | 7/2004 |
| FR | 2872117 | 12/2005 |
| JP | 2004/203158 | 7/2004 |
| JP | 2004-203158 | 7/2004 |
| WO | WO 2005/056344 | 6/2005 |

* cited by examiner

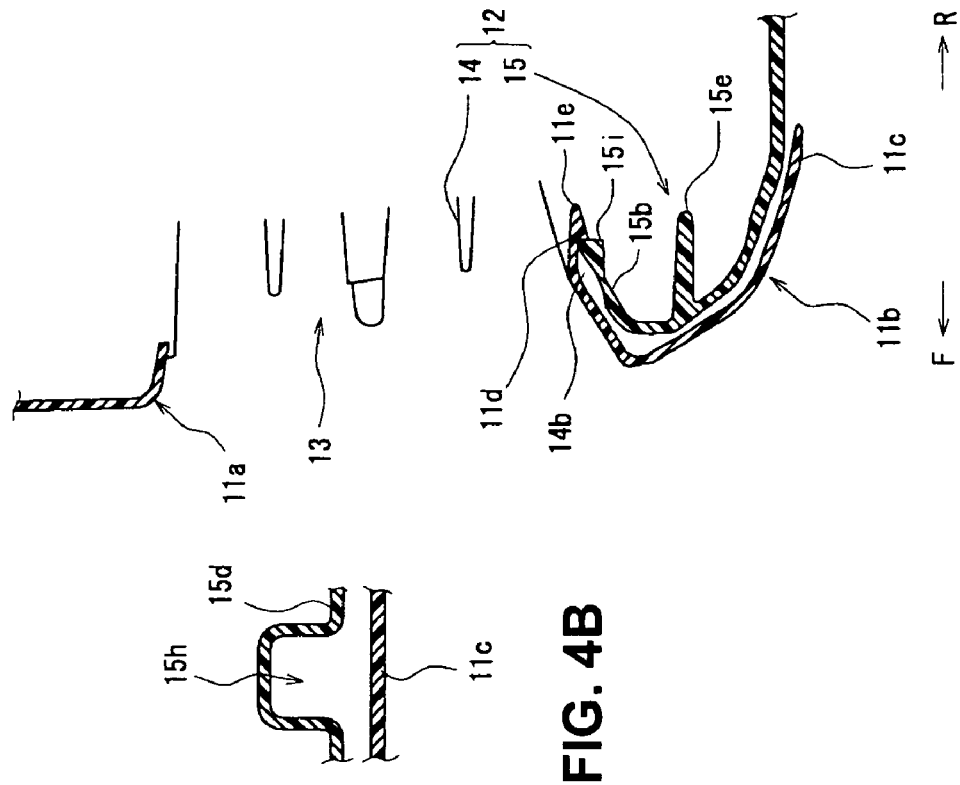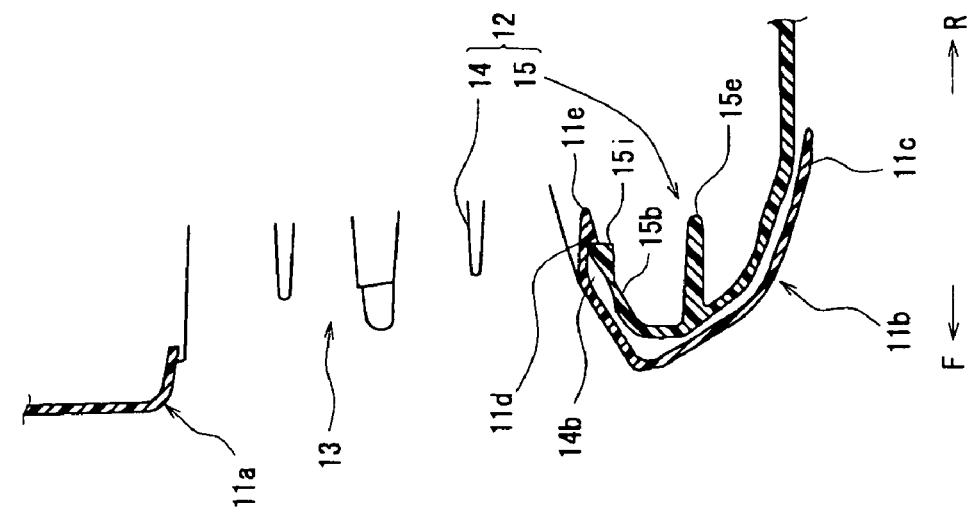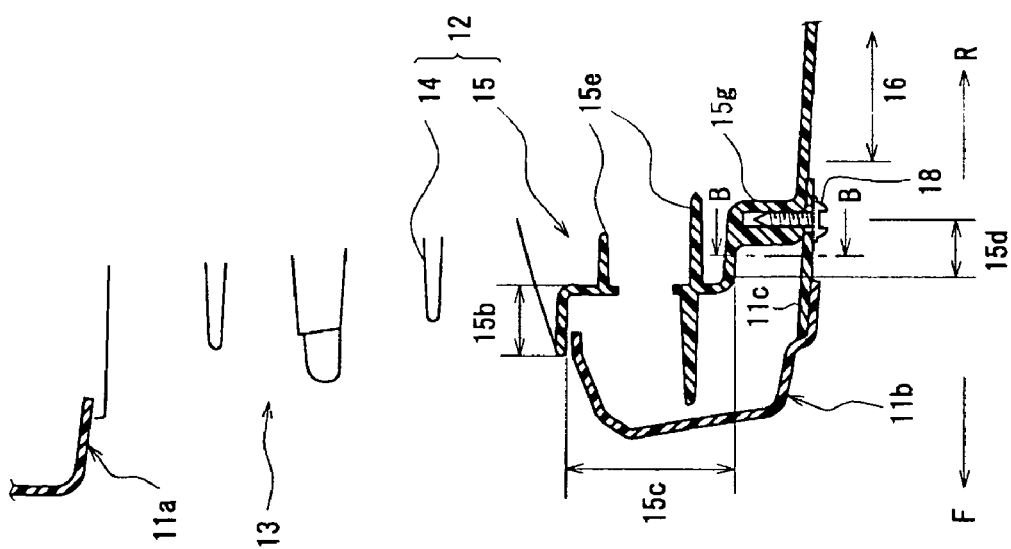

FRONT STRUCTURE OF AUTOMOTIVE VEHICLE

BACKGROUND OF THE INVENTION

The present invention relates to a front structure of an automotive vehicle, and in particular, relates to a structure that comprises a bumper face, a bumper mesh, and a vehicle body structure member that is provided behind the bumper face.

A conventional front structure of an automotive vehicle, in which a bumper face is comprised of an upper portion and a lower portion and a bumper face lower reinforcing portion is provided behind the lower portion of the bumper face, is known (Japanese Patent Laid-Open Publication No. 2004-203158).

The bumper face lower reinforcing portion disclosed in the above-described patent publication may prevent dragging of a pedestrian when the vehicle hits the pedestrian (prevent legs of the pedestrian from being dragged below the vehicle).

The above-described patent publication also discloses a structure in which the bumper face lower reinforcing portion is connected to a cross member via an under cover that covers a front lower face of the vehicle to reduce a vehicle traveling resistance. Thereby, the bumper face lower reinforcing portion may be supported with a high rigidity, suppressing a weight increase, so the prevention of dragging of the pedestrian at the vehicle hitting the pedestrian may be improved.

Herein, the above-described under cover is a member that is originally provided for the purpose of reducing the vehicle traveling resistance, not for increasing the rigidity of the vehicle lower body. Therefore, the rigidity of the under cover may not be very high (strong).

Accordingly, the support strength of the bumper face lower reinforcing portion connected via the under cover may not be sufficient. Thus, there is a problem in that the bumper face lower reinforcing portion moves rearward at the vehicle hitting the pedestrian, so that the bumper face lower reinforcing portion would not perform the prevention of dragging of the pedestrian properly.

Further, since the structure disclosed in the above-described patent publication may require the under cover to support the bumper face lower reinforcing portion, the number of parts of the structure would inevitably increase.

SUMMARY OF THE INVENTION

The present invention has been devised in view of the above-described problems, and an object of the present invention is to provide a front structure of an automotive vehicle that can prevent surely the rearward movement of the bumper face lower reinforcing portion, without increasing the number of parts for supporting the bumper face lower reinforcing portion, and thereby can improve the prevention of dragging of the pedestrian properly.

According to the present invention, there is provided a front structure of an automotive vehicle, comprising a bumper face including an upper portion and a lower portion, an opening portion being formed between the upper and lower portions, a vehicle body structure member provided behind said lower portion of the bumper face, and a bumper mesh including a mesh body that is located at said opening portion of the bumper face, a bumper face lower reinforcing portion that is located inside of said lower portion of the bumper face and connected to a lower end of said lower portion of the bumper face, and an extension portion that extends rearward from a lower end of the bumper face lower reinforcing portion and is connected to said vehicle body structure member.

According to the above-described structure, since the bumper face lower reinforcing portion is directly connected to the vehicle body structure, the bumper mesh including the bumper face lower reinforcing portion can obtain a sufficient support rigidity. Accordingly, the dragging of the pedestrian can be surely prevented when the vehicle hits the pedestrian.

According to an embodiment of the present invention, the vehicle body structure member is a lower portion of a shroud, and the extension portion of the bumper mesh is connected to the lower portion of the shroud. Thereby, the shroud can be properly used as the vehicle body structure for providing the bumper mesh with the sufficient support rigidity.

According to another embodiment of the present invention, the shroud includes an upper portion, a side portion and the lower portion, and is made from resin, at the lower portion of the shroud is provided a heat-exchanger support portion that has a section rigidity that is greater than that of any other portion of the shroud, and the lower portion of the shroud, to which the extension portion of the bumper mesh is connected, is located near the heat-exchanger support portion of the shroud. Thereby, the support rigidity of the bumper mesh including the bumper face lower reinforcing portion can be increased properly without adopting any particular reinforcing parts.

According to another embodiment of the present invention, the heat-exchanger support portion is provided at both side portions of the lower portion of the shroud, and the extension portion of the bumper mesh is provided at both sides of the bumper mesh so as to correspond to a connection portion to the lower portion of the shroud near the heat-exchanger support portion of the shroud. Thereby, since the extension portion of the bumper mesh is connected to the lower portion of the shroud via connection portions that are apart from each other in the vehicle width direction, the support of the bumper mesh including the bumper face lower reinforcing portion can be made properly stable.

According to another embodiment of the present invention, the extension portion of the bumper mesh is connected to a lower face of the lower portion of the shroud, and at substantially a central portion of the extension portion is provided a projection portion that projects upward from the lower face of the lower portion of the shroud and extends longitudinally. Thereby, since the central portion of the extension portion can be rigidly supported at the lower portion of the shroud via the projection portion at the vehicle hitting the pedestrian, the prevention of dragging of the pedestrian can be further improved.

According to another embodiment of the present invention, at the lower portion of the shroud is provided a protrusion portion that protrudes forward at a location above the lower face of the lower portion of the shroud, and the projection portion is connected to a lower face of the protrusion portion. Thereby, both the support rigidity improvement of the bumper mesh including the bumper face lower reinforcing portion and the rigid support of the central portion of the extension portion by the lower portion of the shroud can be obtained.

According to another embodiment of the present invention, at both-side portions of the extension portion are provided guide portions for assembling that extend obliquely downward from behind the connection portion to the lower portion of the shroud. Thereby, the extension portion can be guided at a specified level of the vehicle front portion, namely to the lower face of the lower portion of the shroud, by the guide portions. Accordingly, assembling of the extension portion to the lower portion of the shroud can be improved.

According to another embodiment of the present invention, there are provided front side frames that are provided at both sides of a vehicle front so as to extend in a longitudinal direction, and a sub frame that includes a sub frame body portion, which is provided behind the lower portion of the bumper face and below the front side frames, extension portions, which extend forward from both-side front ends of the sub frame body portion and have a rigidity that is greater than that of the bumper mesh, and a beam portion, which is located behind the bumper face lower reinforcing portion so as to interconnect the extension portions and have a rigidity that is greater than that of the bumper mesh, and the sub frame is disposed in such a manner that the beam portion thereof and the bumper face lower reinforcing portion overlaps each other. Thereby, the rearward impact (load) from the pedestrian at the vehicle hitting the pedestrian is conveyed to the beam portion via the reinforcing portion and an improperly large rearward movement of the reinforcing portion can be prevented by the beam portion located behind. Accordingly, the prevention of dragging of the pedestrian can be further improved. Also, both the prevention of dragging of the pedestrian and the impact energy absorption at a vehicle frontal crush can be improved at the same time by the reinforcing portion, beam portion and extension portion. Further, since the reinforcing portion is formed so as to be integral with the mesh body and separate from the sub frame, the reinforcing portion can be positioned at a proper level for the prevention of dragging of the pedestrian regardless of the position of the beam portion.

According to another embodiment of the present invention, a recess portion is provided at a rear portion of the bumper face lower reinforcing portion, and the beam portion of the sub frame is configured to relatively move into the recess portion of the bumper face lower reinforcing portion. Thereby, since the beam portion can be located as forward as possible ensuring the proper prevention of dragging of the pedestrian, the sufficient length of the extension can be obtained, thereby improving the impact energy absorption.

According to another embodiment of the present invention, at the recess portion is provided an upright face that extends substantially vertically facing a front end portion of the beam portion of the sub frame. Thereby, the reinforcing portion can be surely prevented from moving rearward passing through the beam portion even if the reinforcing portion hits the beam portion and further the impact load acts from the vehicle front. Accordingly, the rearward movement of the reinforcing portion can be surely prevented.

According to another embodiment of the present invention, the sub frame body portion includes a front cross member that is located behind the beam portion so as to extend in a vehicle with direction, and the extension portion of the bumper mesh is connected to the front cross member. Thereby, since a relative position between the reinforcing portion and the beam portion is maintained properly, any deterioration of the prevention of dragging of the pedestrian that may be caused by an improper matching of the reinforcing portion with the beam portion can be avoided.

According to another embodiment of the present invention, the extension portion has a plurality of projection portions along a vehicle width direction that extend substantially longitudinally. Thereby, the properly high rigidity of the extension portion with respect to the impact load from the vehicle front can be provided at the vehicle hitting the pedestrian.

According to another embodiment of the present invention, behind the bumper face is provided a shroud that includes an upper portion, a side portion and the lower portion and is made from resin that has a rigidity that is greater than that of a material of said bumper mesh, and at the lower portion of the shroud is provided a forward extension portion, a front end of which extends near said bumper face lower reinforcing portion. Thereby, since the forward extension portion is formed integrally with the lower portion of the shroud and also the reinforcing portion is formed integrally with the mesh body, the rearward movement of the reinforcing portion can be properly prevented without increasing the number of parts.

According to another embodiment of the present invention, the forward extension portion has a plurality of ribs. Thereby, since the rigidity of the forward extension portion can be increased without providing any other reinforcing members, the rearward movement of the reinforcing portion can be properly prevented.

Other features, aspects, and advantages of the present invention will be apparent from the following description which refers to the accompanying drawings.

BRIEF DESCRIPTION OF THE DRAWINGS

FIG. 4A is a sectional view taken along line A-A of FIG. 3A, FIG. 4B is a sectional view taken along line B-B of FIG. 4A, and FIG. 4C is a sectional view taken along line C-C of FIG. 3A.

DETAILED DESCRIPTION OF THE INVENTION

Hereinafter, preferred embodiments of the present invention will be described referring to the accompanying drawings.

Embodiment 1

Figure 1:
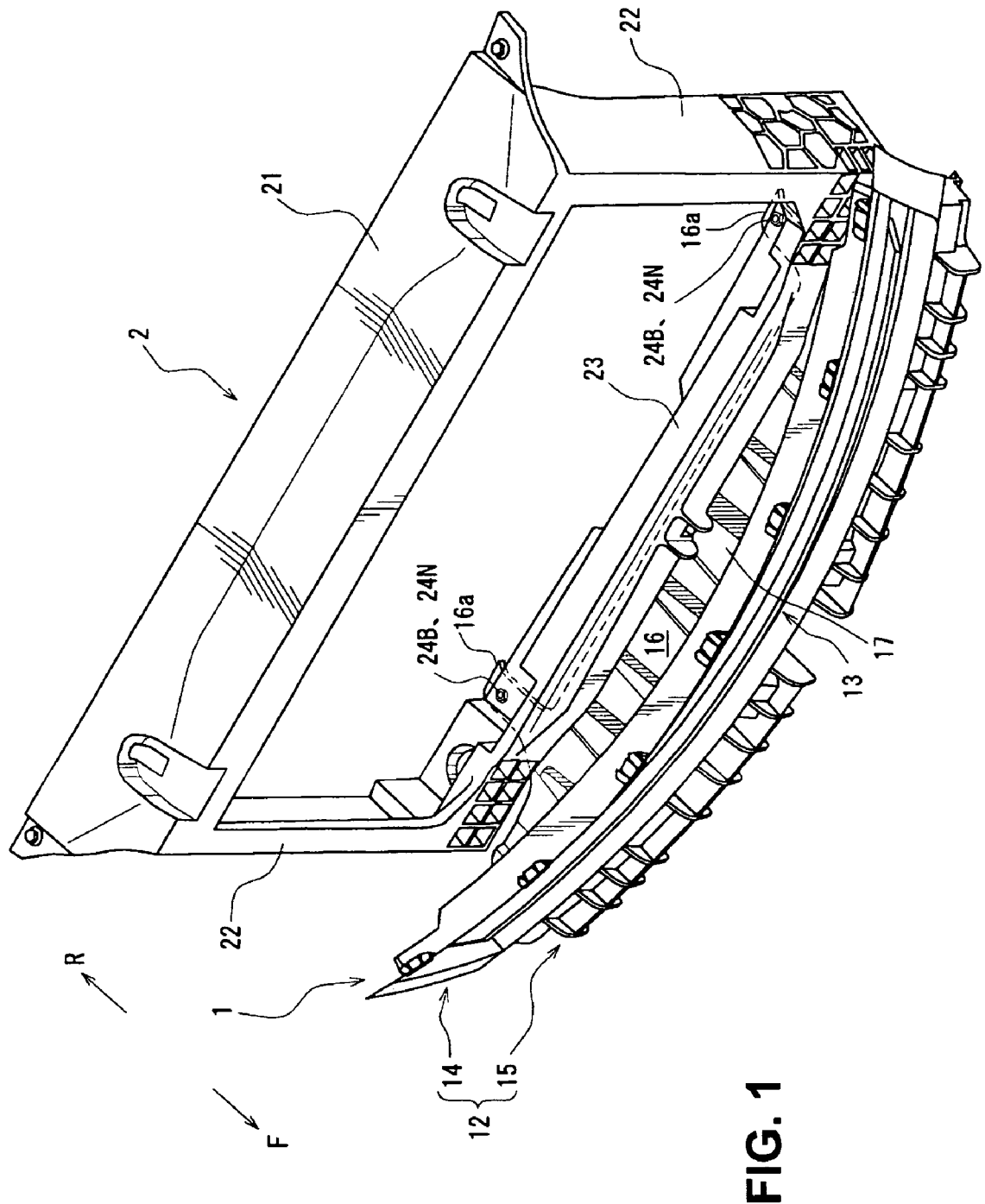
FIG. 1 is a front perspective view showing a front structure of an automotive vehicle according to a first embodiment of the present invention.
Figure 2:
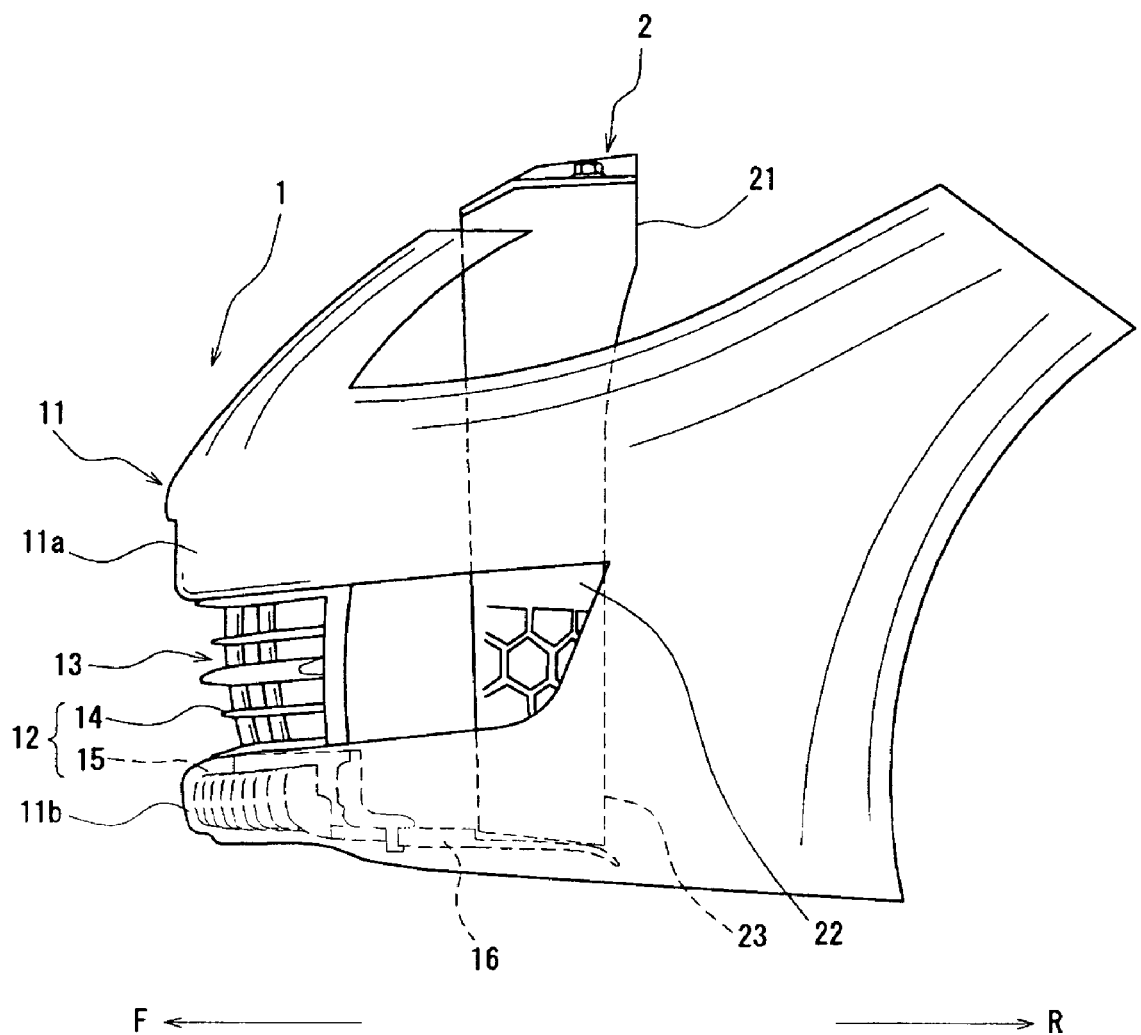
FIG. 2 is a side view showing a bumper structure body of the front structure of an automotive vehicle according to the first embodiment of the present invention.

FIG. 1 is a front perspective view showing a front structure of an automotive vehicle according to an embodiment of the present invention. FIG. 2 is a side view showing a bumper structure body 1 of the front structure of an automotive vehicle according to an embodiment of the present invention. The front structure of an automotive vehicle of the present embodiment mainly comprises a bumper structure body 1 and a shroud 2 that is provided behind the bumper structure body 1 as shown in FIG. 1. The shroud 2 of the present embodiment is substantially a rectangular-shaped resin-made member that mainly comprises an upper portion 21, side portion 22, and lower portion 23. An arrow F in the figure shows a vehicle front direction and an arrow R shows a vehicle rear direction.

The bumper structure body 1, as shown in FIGS. 1 and 2, comprises a bumper face 11 (not illustrated in FIG. 1) and a bumper mesh 12, which is assembled at the vehicle front portion.

The bumper face 11 comprises an upper portion Ha and a lower portion 11b, which are formed integrally as shown in FIG. 2. A laterally-long opening portion 13 is formed between the upper portion 11a and the lower portion 11b. A grille-shaped mesh body 14 is attached to the opening portion 13 from the vehicle front side so as to allow an outside air flowing into the opening portion 13.

A arc-shaped bumper face lower reinforcing portion 15 (hereinafter, referred to as "reinforcing portion 15") is provided inside of the lower portion 11b of the bumper face 11 so as to extend in a vehicle width direction. The bumper mesh 12 comprises the mesh body 14 located at the opening portion 13 and the above-described reinforcing portion 15.

An extension portion 16 is provided at the reinforcing portion 15 so as to extend rearward from a lower end of the reinforcing portion 15, and the extension potion 16 further includes two connection projection portions 16a, 16a that extend rearward at both sides thereof.

Further, the extension portion 16 includes a projection portion 17 at a central portion thereof, which is formed so as to project upward and extend longitudinally.

According to the present embodiment, the connection projection portions 16a are connected to a lower face of the lower portion 23 of the shroud 2 provided behind the bumper face 11 via bolts 24B and nuts 24N, whereby the reinforcing portion 15 is supported.

Figure 3A:
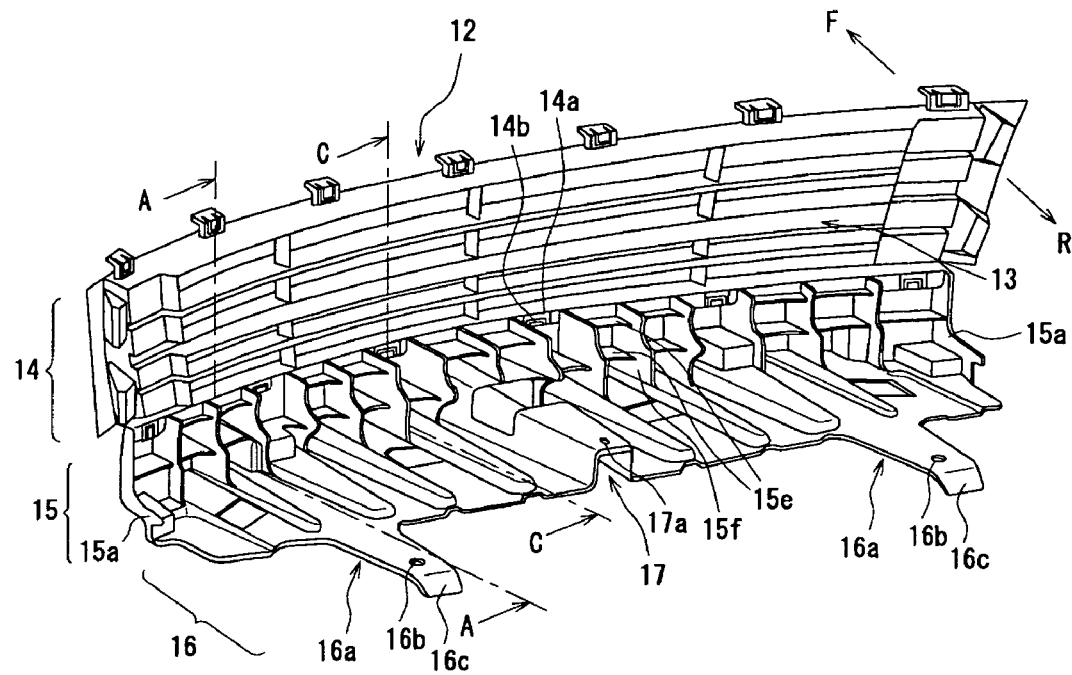
FIG. 3A is a rear perspective view showing a bumper mesh of the bumper structure body of FIG. 1.
Figure 3B:
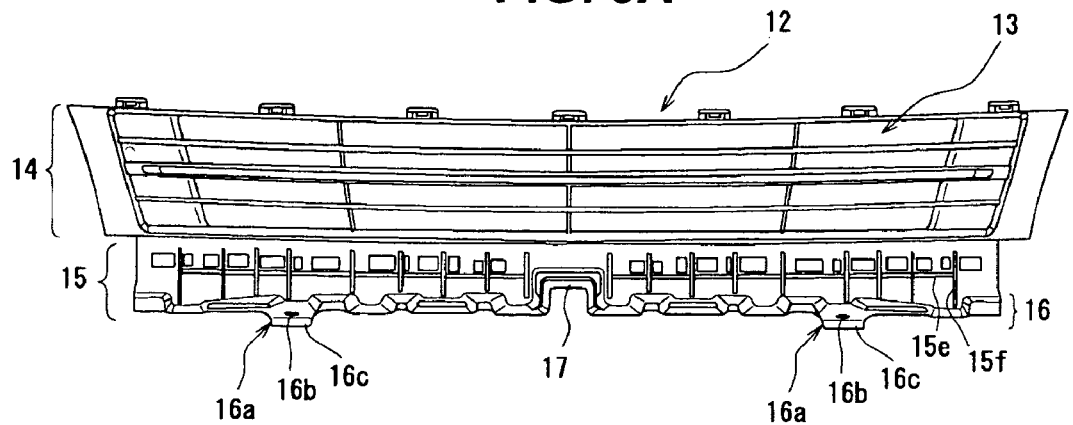
FIG. 3B is an elevation view showing the bumper mesh.

Hereinafter, the structure of the bumper structure body 1 will be further described referring to FIGS. 3 and 4. FIG. 3A is a rear perspective view showing the bumper mesh 12 of the bumper structure body 1 of FIG. 1, and FIG. 3B is an elevation view showing the bumper mesh 12. FIG. 4A is a sectional view taken along line A-A of FIG. 3A, FIG. 4B is a sectional view taken along line B-B of FIG. 4A, and FIG. 4C is a sectional view taken along line C-C of FIG. 3A.

In FIG. 3A, a frame of the reinforcing portion 15 is comprised of side face portions 15a that extend rearward at both-side ends, an upper face portion 15c that extends forward (see FIG. 4), a front face portion 15c that extends downward from the upper face portion 15b (see FIG. 4), and a lower face portion 15d that extends rearward from the front face portion 15c. The reinforcing portion 15 further includes lateral ribs 15e that connect the side face portions 15a and extend rearward, and a plurality of vertical ribs 15f that connect the upper face portion 15b, front face portion 15c and lower face portion 15d so as to be located substantially perpendicularly to the lateral rib 15e. Although two lateral ribs are provided in FIG. 4, a single lateral rib or three or more lateral ribs may be provided.

Front portions of the lateral and vertical ribs 15e, 15f are formed integrally with the front face portion 15c without projecting forward. Thereby, an improper concentration of an impact force at a tip portion of an impact absorption member at the vehicle hitting the pedestrian may be avoided, so that a damage against a hitting portion of the pedestrian can be properly reduced.

The extension portion 16 is formed integrally with the lower face portion 15d, and at the connection projection portions 16a, 16a of the extension portion 16 are formed bolt holes 16b, 16b for, connection to the lower portion 23 of the shroud 2. Also, at the connection projection portions 16a, 16a of the extension portion 16 are provided guide faces 16c that extend obliquely downward from behind the bolt holes 16b, 16b toward tip ends thereof (rearward of the vehicle).

Further, the extension portion 16 has a plurality of projection portions that project upward and extend longitudinally as shown in FIG. 3A. Namely, the extension portion 16 is formed in a rib shape, and thereby it can provide a high rigidity against the impact load from the front at the vehicle hitting the pedestrian. The projection portion that is located at a central portion is the above-described projection portion 17 that projects higher than others. At an upper end face of the projection portion 17 is formed a bolt hole 17a like the connection projection portion 16a.

Another type of shape may be applied to the extension portion 16, not being limited to the above-described rib shape. For example, a plurality of ribs extending slant are provided on part of the upper face of the extension portion 16 except the projection portion 17, which provides a so-called honeycomb shape.

In the connection structure of the reinforcing portion 15a and the bumper face 11, as shown in FIG. 4A, plural thick portions 15g are provided at a rear portion of the lower face portion 15d of the reinforcing portion 15, which are connected to a rear end portion 11c via connection members 18. Thereby, the lower portion 11b of the bumper face 11 is supported at the shroud 2 as well as the reinforcing portion 15 (see FIG. 1).

Herein, the lower face portion 15d of the reinforcing portion 15 that reaches the thick portion 15g has a reinforcing projection portion 15h that projects upward as shown in FIG. 4B. Namely, the lower face portion 15d has a cubic shape, in which that it has walls at its three sides in front of the thick portion 15g that is the connection portion to the rear end portion 11c of the bumper face 11. Thereby, it provides an efficiently strong structure against the hitting the pedestrian.

In a relationship between the upper portion of the rear end portion 11c of the lower portion 11b of the bumper face 11 and the reinforcing portion 15, no thick portion 15g is provided at the rear portion of the lower face portion 15d of the reinforcing portion 15 as shown in FIG. 4C, unlike FIG. 4A, and therefore it is not connected to the rear end portion 11c of the lower portion 11b of the bumper face 11. However, engagement holes 14b are formed at a down face 14a that is provided above the reinforcing portion 15 (see FIG. 3), and hook portions 11e extend rearward from the upper face portion 11d of the lower portion 11b of the bumper face 11 and go through the above engagement holes 14b. And, the hook portions 11e are formed at a rear end of the upper face portion 15b of the reinforcing portion and engaged with hook-engagement portions 15i of the lower face of the engagement holes 14b. Herein, the hook portion 11e may be formed up side down so that it is engaged with the mesh body 14.

Figure 5:
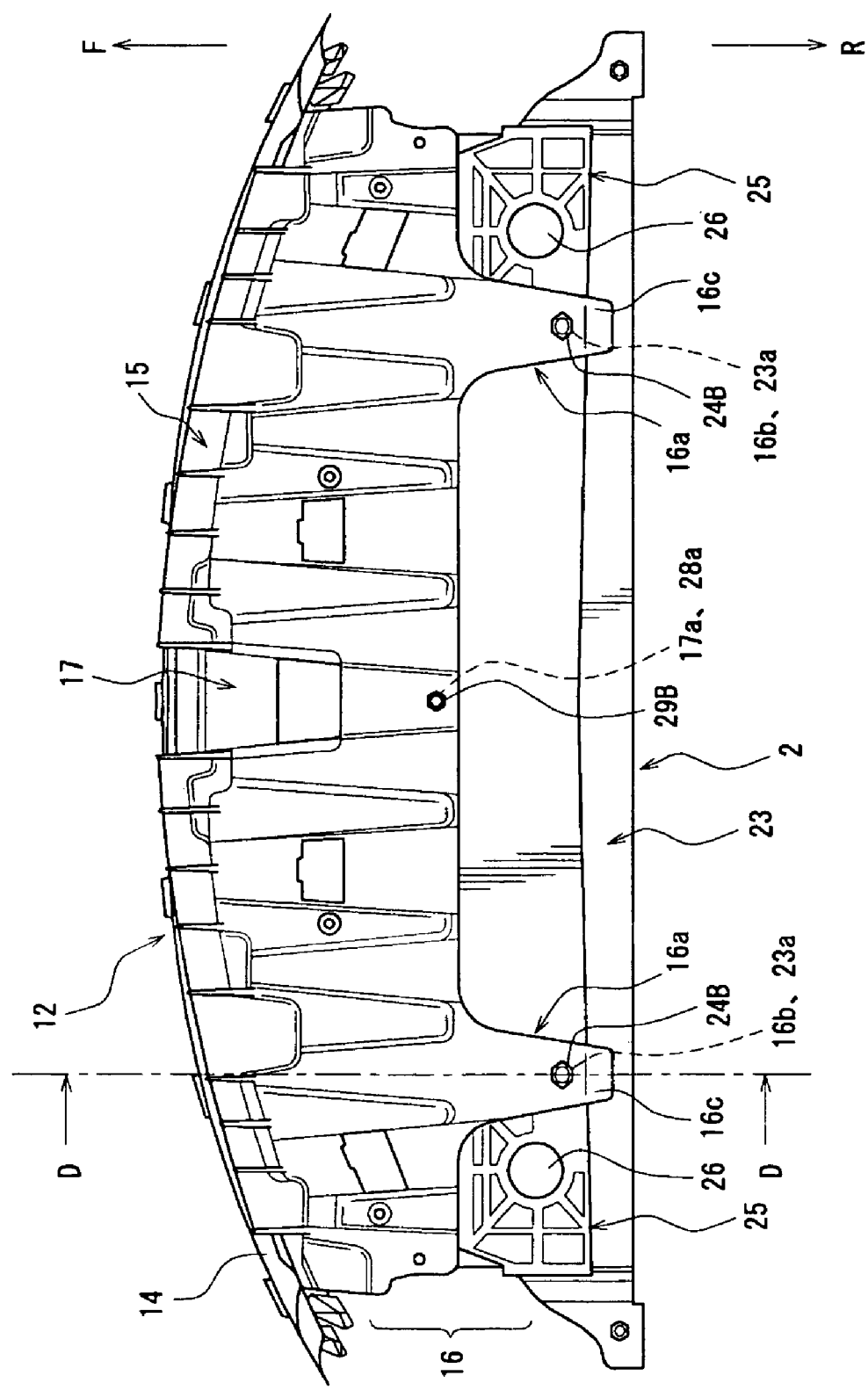
FIG. 5 is a bottom view showing a connection state of an extension portion of a bumper face lower reinforcing portion and a shroud.
Figure 6:
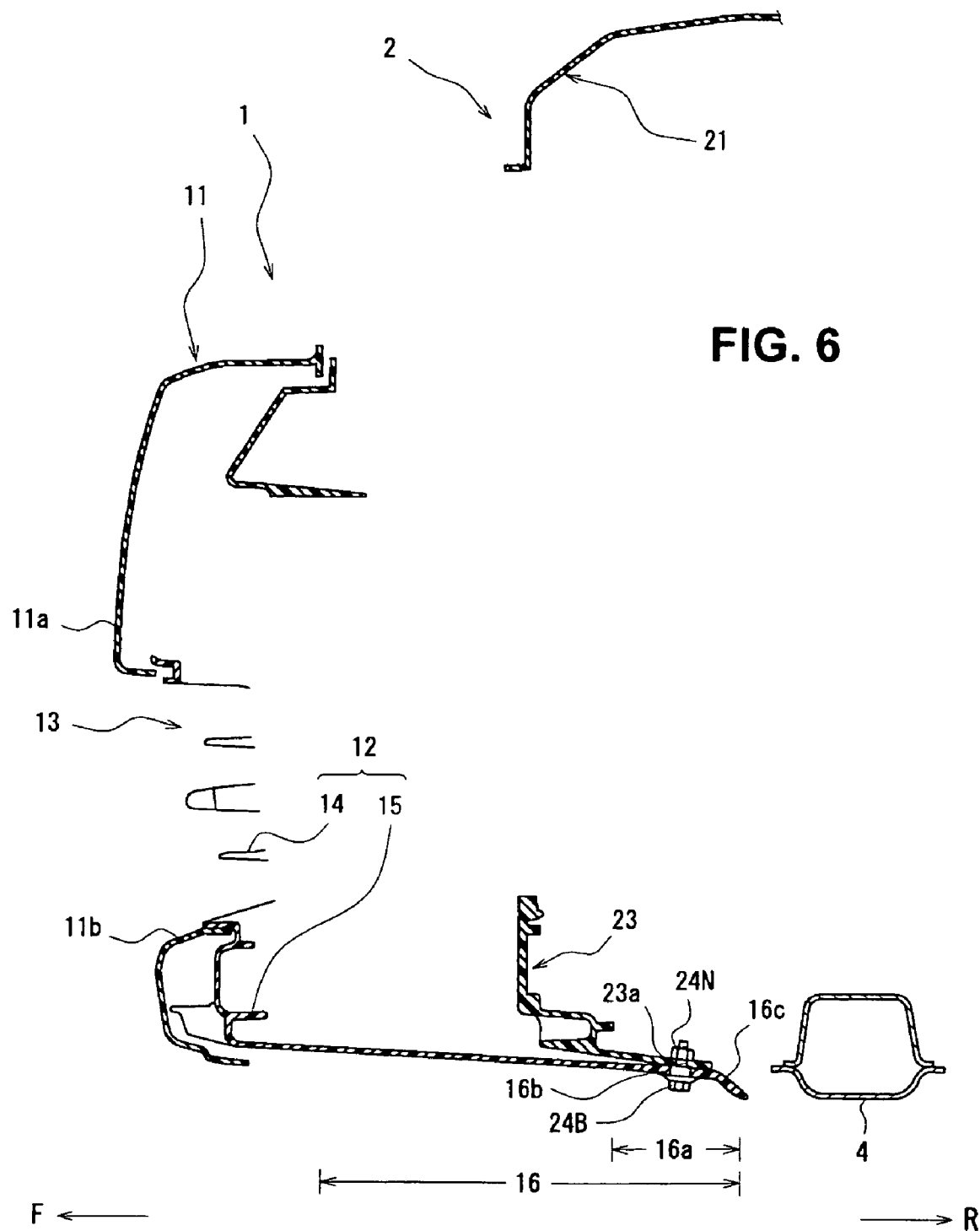
FIG. 6 is a sectional view taken along line D-D of FIG. 5.
Figure 7:
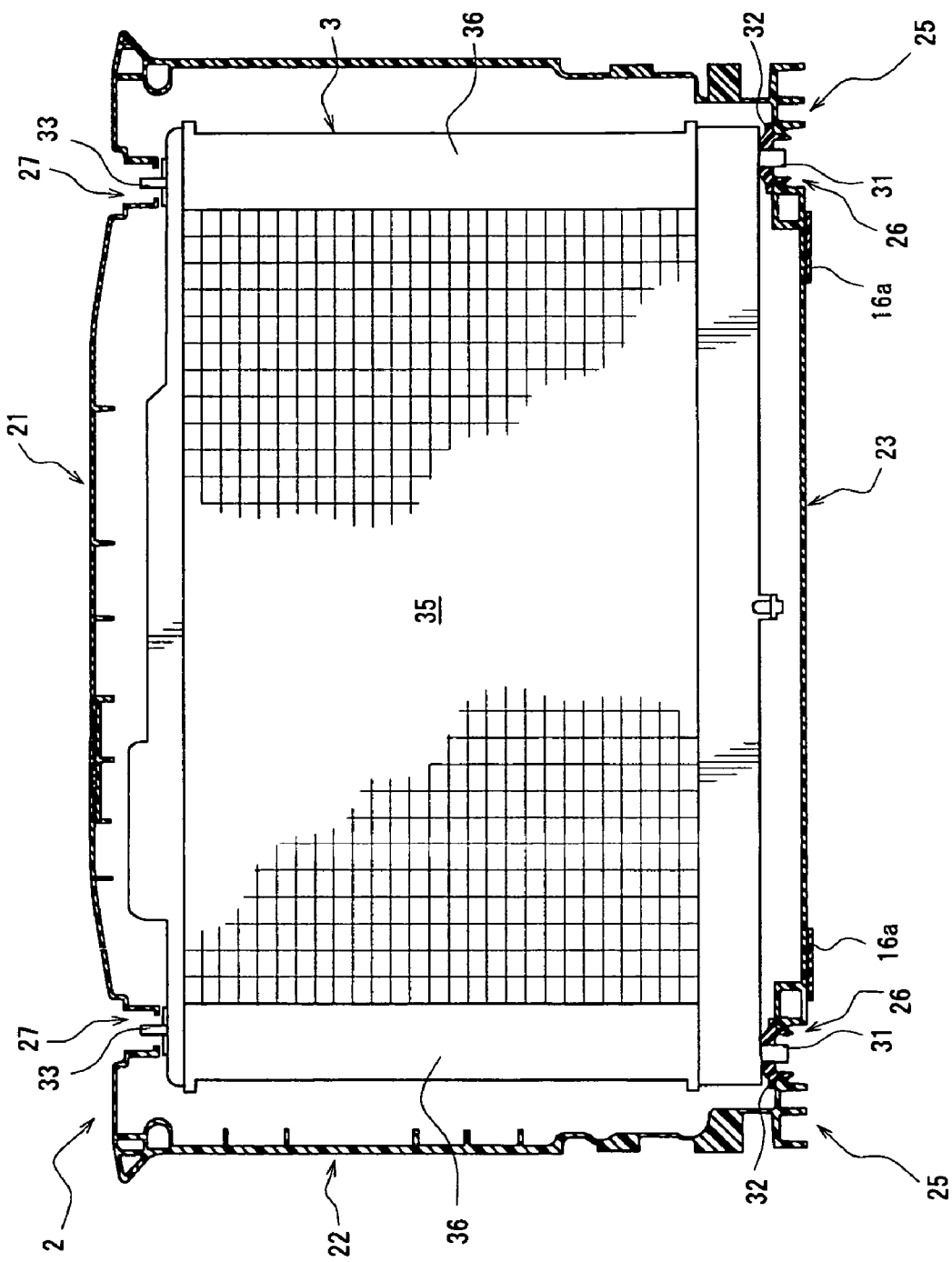
FIG. 7 is a sectional view showing an assembly state of a radiator to the shroud.
Figure 8:
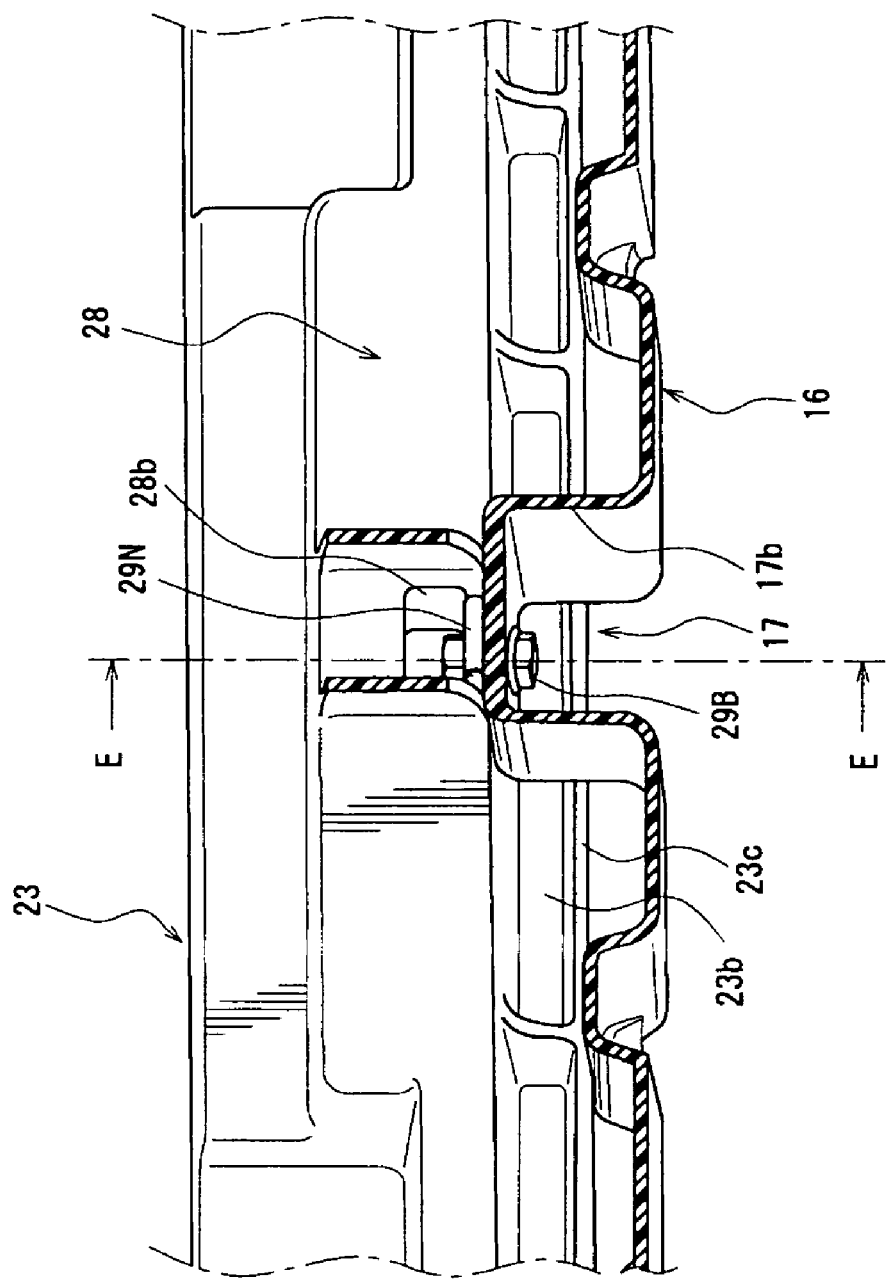
FIG. 8 is a front perspective view showing a connection state of a projection portion of the extension portion and a lower face of an protrusion portion of the shroud.
Figure 9:
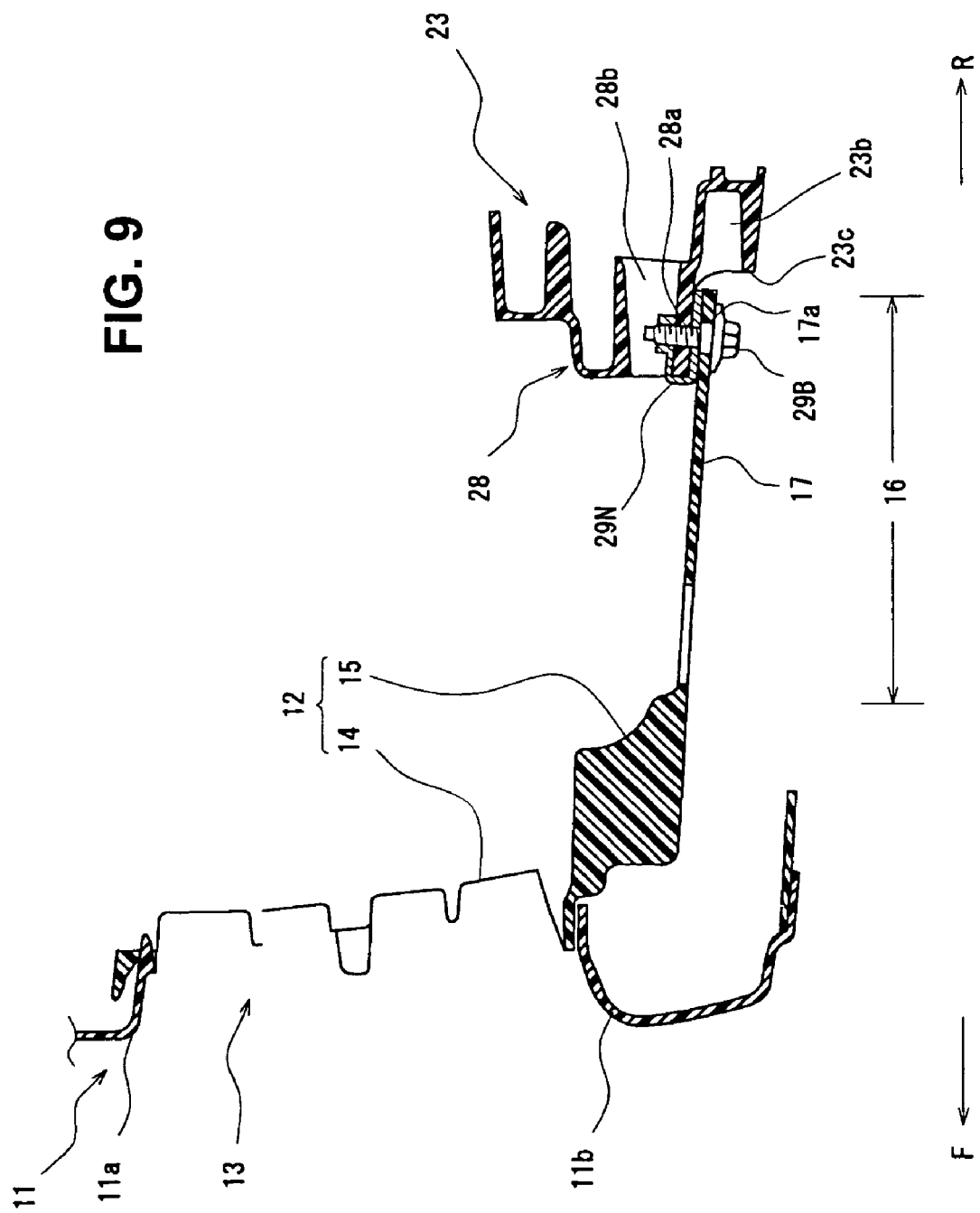
FIG. 9 is a sectional view taken along line E-E of FIG. 8.

Hereinafter, the structure of the shroud 2 and the support structure of the reinforcing portion 15 will be described referring to FIGS. 5 to 9. FIG. 5 is a bottom view showing a connection state of the extension portion 16 of the reinforcing portion 15 and the shroud 12. FIG. 6 is a sectional view taken along line D-D of FIG. 5. FIG. 7 is a sectional view showing an assembly state of the radiator 3 to the shroud 2. FIG. 8 is a front perspective view showing a connection state of the projection portion 17 of the extension portion 16 and the lower face of the protrusion portion 28 of the shroud 2. FIG. 9 is a sectional view taken along line E-E of FIG. 8.

As shown in FIGS. 5 and 6 as well, the reinforcing portion 15 is connected to the lower face of the lower portion 23 of the shroud 2 at the both connection projection portions 16a of the extension portion 16 via the bolts 24B and nuts 24N. Specifically, the bolts 24B are inserted into the bolt holes 16b of the connection projection portions 12a and bolt holes 23a that are formed at the lower face of the lower portion 23, and fastened with the nuts 24N from the above.

Generally, the shroud 2 is made of a hard material that is strong enough to support the radiator 3 (see FIG. 7), and the reinforcing portion 15 of the bumper mesh 12 is directly connected to the lower portion 23 of the shroud 2 via the extension portion 16 as described above, so the bumper mesh 12 including the reinforcing portion 15 can obtain a sufficiently high support rigidity. Accordingly, the movement of the reinforcing portion 15 at the vehicle hitting the pedestrian can be suppressed properly, and since it may not be necessary to provide any connecting members such as an under-cover member, which may be necessary conventionally, the prevention of dragging of the pedestrian can be properly improved without increasing the number of parts.

In FIG. 6, a member 4 that is provided behind the connection portion of the lower portion 23 and the connection projection portion 16a in back of the shroud is a cross member that extend in the vehicle width direction so as to interconnect right-and-left side frames (not illustrated) of the vehicle. In the present embodiment, the extension portion 16 is connected to the shroud 2 before this cross member 4, so the length of the extension portion 16 is made shorter.

Herein, in the case of the present embodiment in which the shroud 2 is made from resin, as shown in FIG. 5, there are provided support portions 25 having a rib shape with many projections, whose sectional rigidity is higher than that of other portions, at the lower face of the lower portion 2 of the shroud 2. Thus, the above-described connection projection portions 16a of the present embodiment are connected to portions adjacent to these support portions 25.

A through hole 26 is formed at a center of each of the support portions 25, and a shaft member 31, which is fixed to a lower portion of the radiator 3 as a heat exchanger, is inserted into each through hole 26 as shown in FIG. 7.

Thereby, the radiator 3 is resiliently mounted on the lower portion 23 of the shroud 2 via a mount rubber 32 attached to each shaft member 31, which is not illustrated in FIGS. 1 and 6.

The radiator 3 has shaft members 33 at its upper portion that extend upward respectively so as to correspond to the above-described shaft members 31. The shaft members 33 are provided so as to be inserted into through holes 27 that are formed at the upper portion 21 of the shroud 2.

Herein, the conventional type of radiator 3, which has a side tank 34 and a radiator core 35 at one side and a side tank 36 on the other side, is applied in the present embodiment.

Thereby, since the radiator 3 is supported at the strong support portions 25 of the lower portion 23 of the shroud 2, the proper support of the radiator 3 is provided.

Further, according to the present embodiment, the connection projection portions 16a of the extension portions 16 are connected to the portions near the support potions 25, so the support rigidity of the bumper mesh 12 including the reinforcing portion 15 can be improved without providing any particular reinforcing portion.

The shroud 2 may be made from metal, and in this case the lower portion 23 may have a sufficient rigidity, so there may be no need for providing any particular portion having the high sectional rigidity. Accordingly, the connection portion of the above-described extension portion 16 may be provided at any location.

According to the present embodiment, the support portions 25 are provided at the both-side portions of the lower portion 23 of the shroud 2, the connection projection portions 16a of the extension portion 16 are provided so as to correspond to the support portions 25, and these portions 16a, 25 are connected via the bolts and nuts 24B, 24N.

Thereby, since the both-side connection projection portions 16a of the extension portion 16 are connected to the both-side portions of the lower portion 23 of the shroud 2, the both-side connection portions are located away from each other in the vehicle width direction. Accordingly, the support of the reinforcing portion 15 at the lower portion 23 of the shroud 2 can be more stable compared to a case where the connection portions are located near the center of the shroud 2.

Also, in the connection state of the extension portion 16 to the lower portion 23 of the shroud 2, the above-described projection portion 17 at the central portion of the extension portion 16 projects upward from the lower face of the lower portion 23 of the shroud 2 and contacts the front face of the lower portion 23, as shown in FIGS. 8 and 9.

At the lower portion 23 of the shroud 2 is provided the protrusion portion 28 that protrudes forward at a location above the lower face of the lower portion 23, and below the protrusion portion 28 are provided projection faces 23c that are formed so as to relatively project by forming plural recess portions 23b. Thereby, in the connection state of the extension portion 16 and the lower portion 23 of the shroud, an upright face 17b of the projection portion 17 contacts the projection face 23c.

Further, a tunnel portion 28b is formed at the protrusion portion 28 at a central portion of the lower portion 23 of the shroud 2, and a nut member 29N with a U-shaped section is welded to an inner wall of the tunnel portion 28b.

A bolt 29B is inserted into a bolt hole 17a that is formed at the projection portion 17 and a bolt hole 28a that is formed at the lower portion of the protrusion portion 28, and fastened with the nut member 29N, so the projection portion 17 is connected to the protrusion portion 28.

Thereby, since the central portion of the extension portion 16 can be rigidly supported at the lower portion 23 of the shroud 2 via the projection portion 17 at the vehicle hitting the pedestrian, the prevention of dragging of the pedestrian can be further improved.

Also, since the projection portion 17 is formed by injection molding in molding the resin extension portion 16, the rigidity of the projection portion 17 can be increased with a simple structure. Thereby, manufacturing costs of the reinforcing portion 15 with the extension portion 16 can be reduced. Also, since the projection portion 17 is formed so as to extend in the longitudinal direction of the extension portion 16, the properly high rigidity against the impact load from the front at the hitting the pedestrian can be provided.

Further, since not only the projection portion 17 contacts the lower portion 23 of the shroud 2, but the projection portion 17 is connected to the lower face of the protrusion portion 28, both the support rigidity improvement of the bumper mesh 21 including the reinforcing portion 15 and the rigid support of the central portion of the extension portion 16 by the lower portion 23 at the hitting the pedestrian can be obtained.

Figure 10:
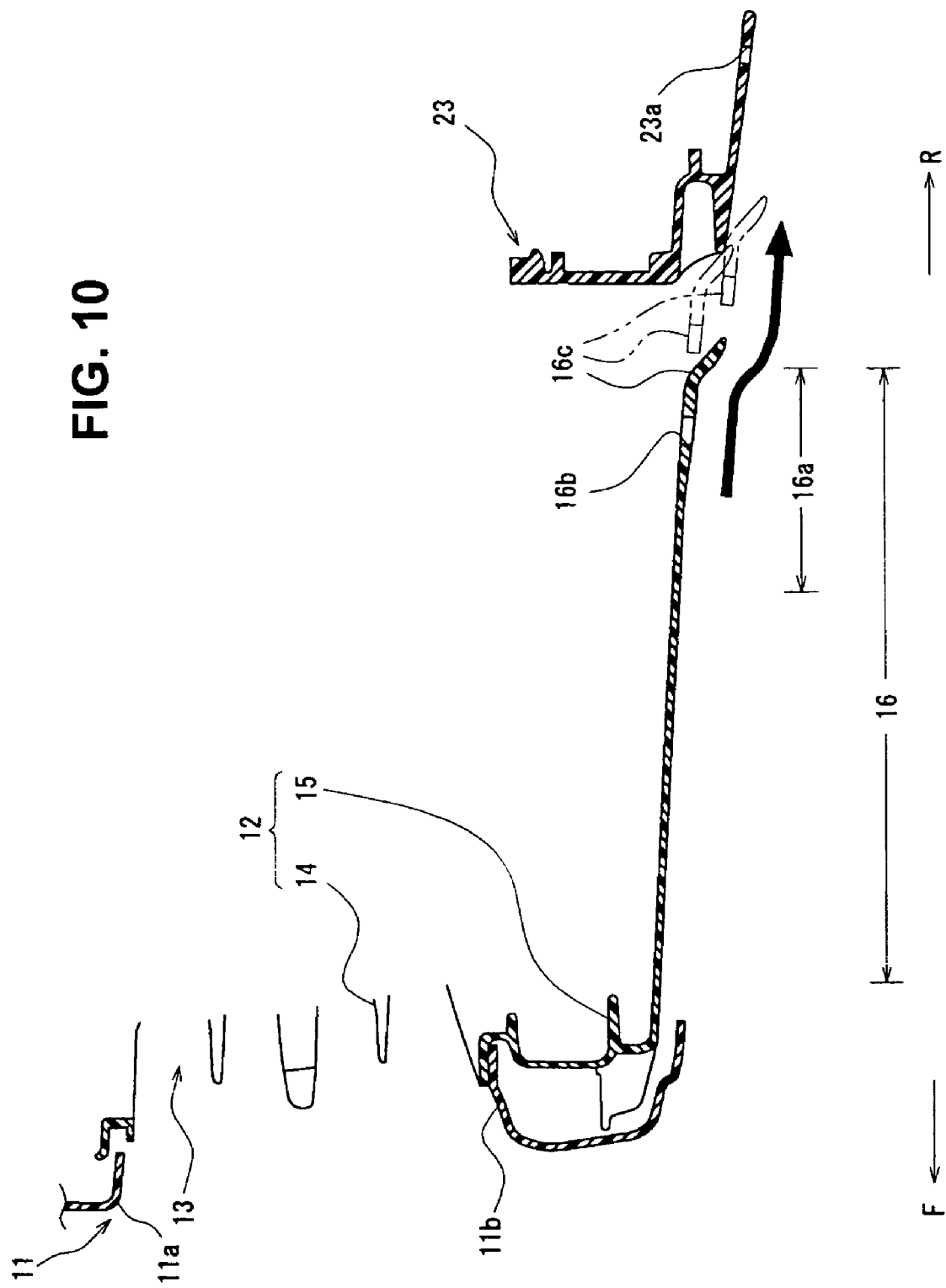
FIG. 10 is an explanatory diagram showing a step of assembling the bumper structure body to the shroud.

Herein, the bumper structure body 1 is assembled to the vehicle body through a step of connecting the extension portion 16 to the lower portion 23 of the shroud 2. Herein, the bumper structure body 1 is formed as a unit body by preassembling the bumper face 11 to the bumper mesh 12 with the mesh body 14 and reinforcing portion 15. The bumper structure body 1 formed as the unit body is provided from the front of the vehicle, and then the above-described assembly step is conducted. In the process of the provision of the bumper structure body 1, as shown by a two-dotted broken line in FIG. 10, the guide face 16c of the tip of the connection projection portion 16a is guided so as to slide on the front face of the lower portion of the shroud 2. Thereby, the extension portion 16 (bumper structure body 1) can be guided to a specified level, namely to the lower face of the lower portion 23 of the shroud 2 surely. Accordingly, the assembly of the extension portion 16 to the lower portion 23 can be improved by the guide face 16c.

Herein, instead of the above-described structure of the present embodiment, for example, there may be provided portions at the both extension portions 16, which correspond to the above-described projection portion 17, and these portions at the extension portions 16 may be connected to lower faces of both-side portions of the protrusion portion 28 of the lower portion 23 of the shroud 2.

Herein, the heat exchanger is the radiator 3, the heat exchanger support portion is the support portion 25, and the guide portion for assembly is the guide face 16c.

Embodiment 2

Figure 11:
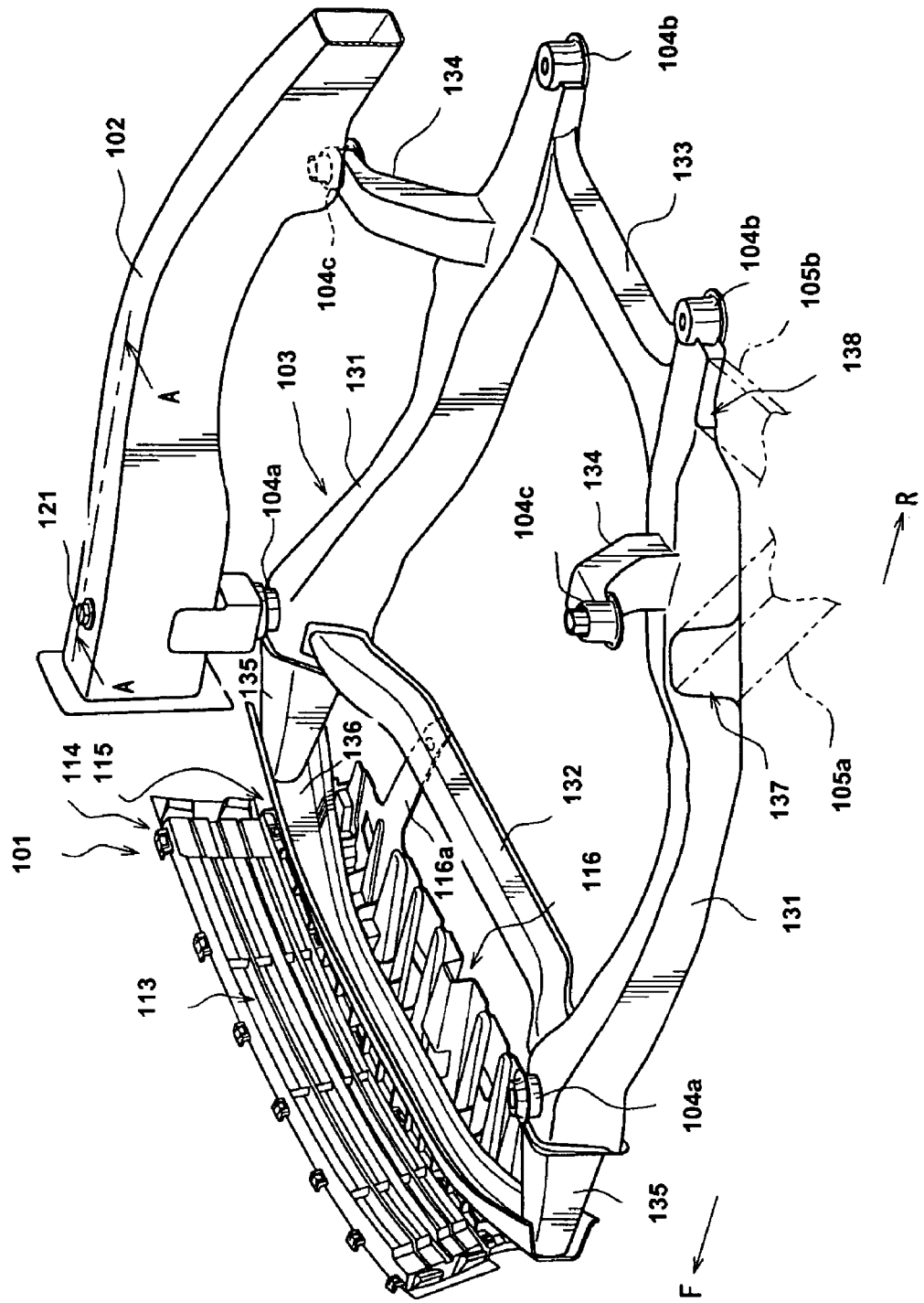
FIG. 11 is a front perspective view showing a front structure of an automotive vehicle according to a second embodiment of the present invention.
Figure 12:
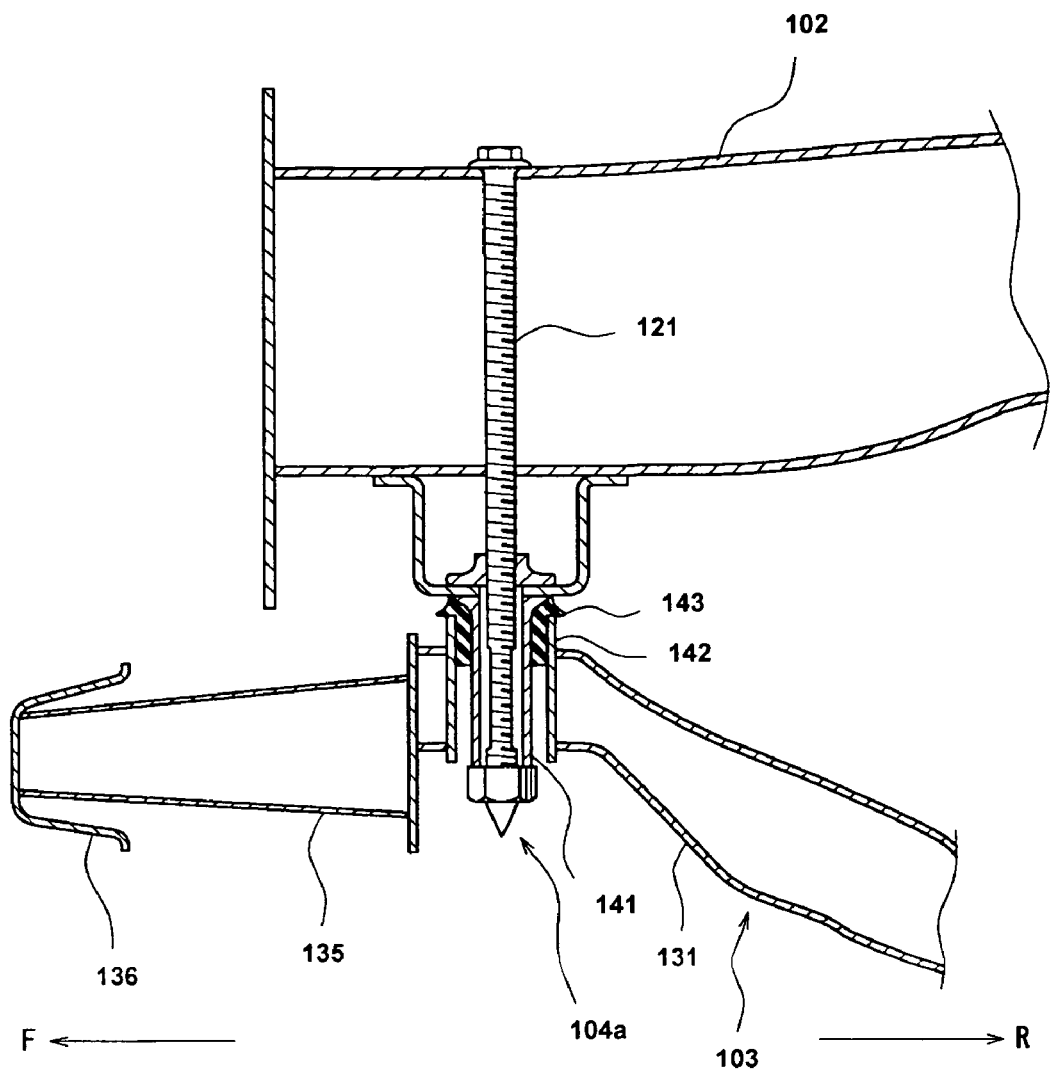
FIG. 12 is a sectional view taken along line A-A of FIG. 11.
Figure 13:
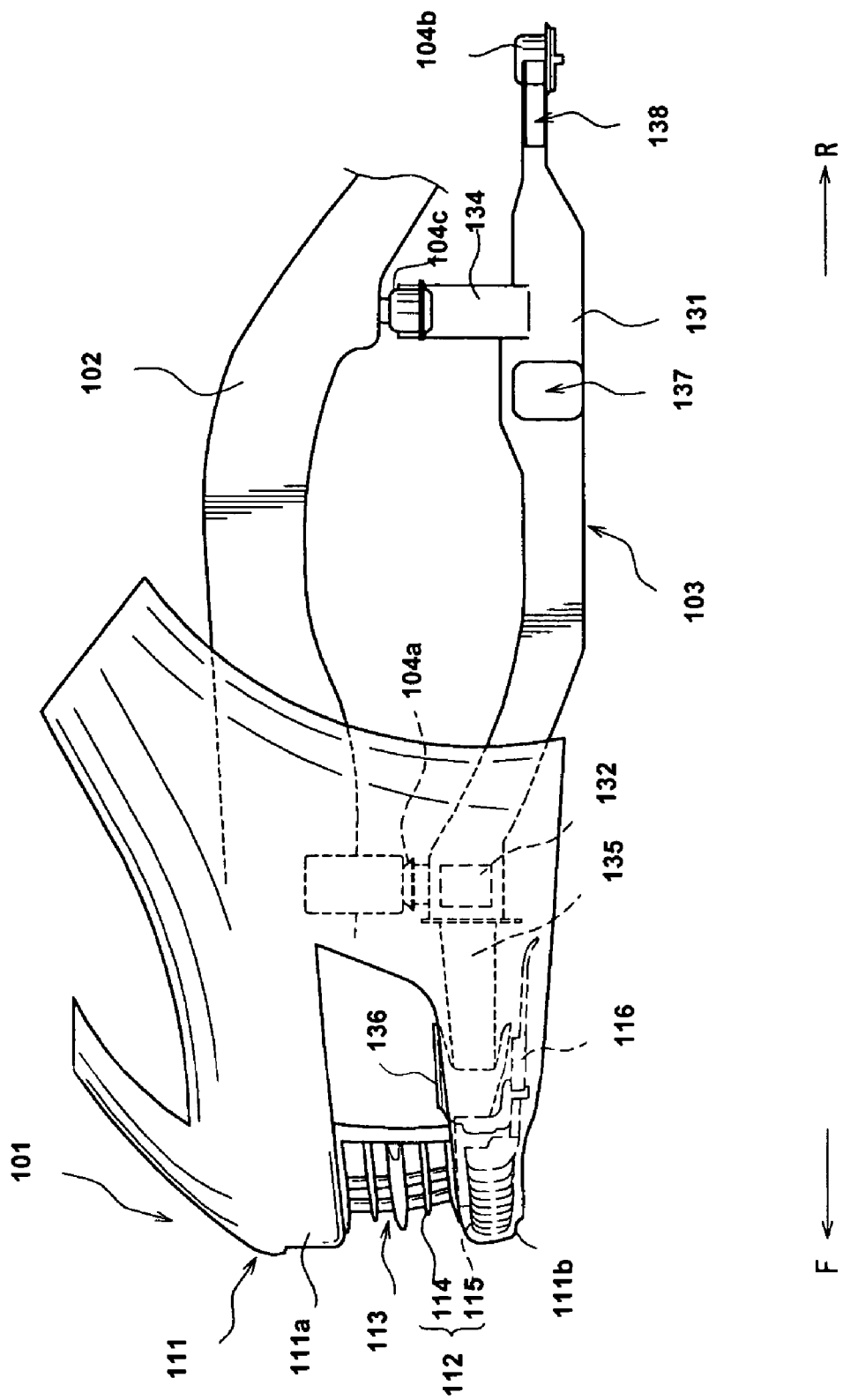
FIG. 13 is a side view showing the front structure of an automotive vehicle according to the second embodiment of the present invention.
Figure 14:
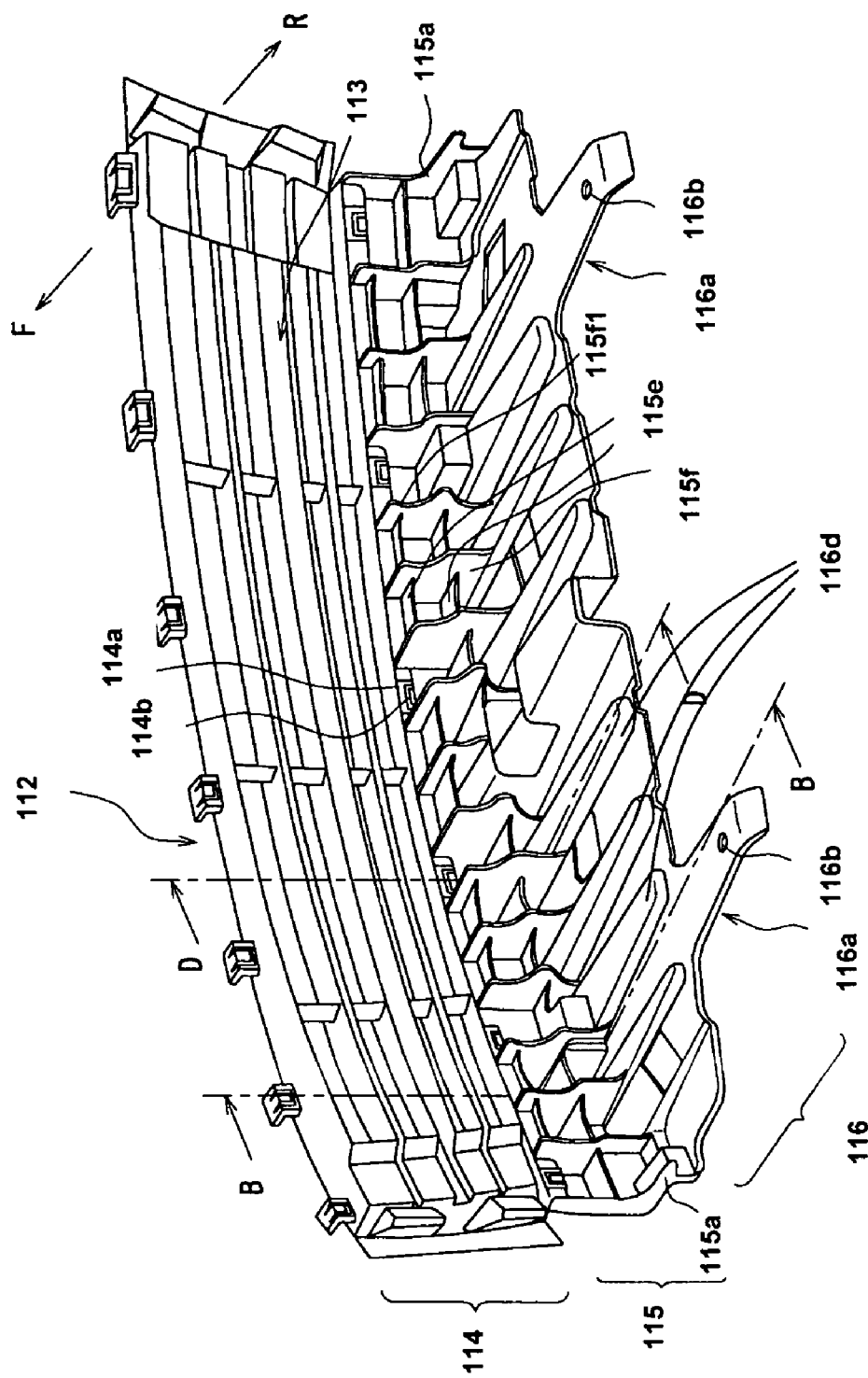
FIG. 14 is a rear perspective view showing a bumper mesh of a bumper structure body of FIG. 11.
Figure 15:
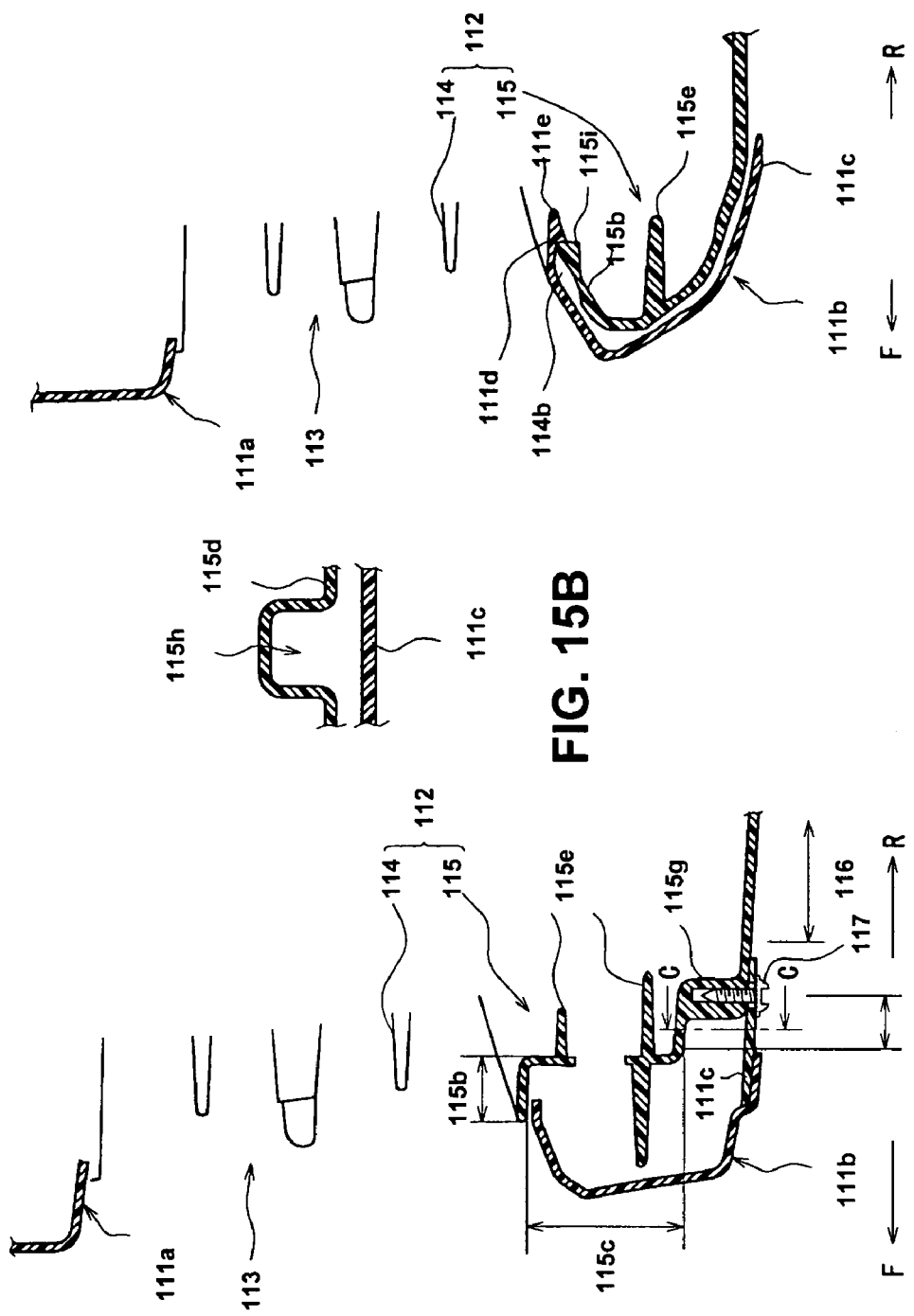
FIG. 15A is a sectional view taken along line B-B of FIG. 14.
FIG. 15B is a sectional view taken along line C-C of FIG. 15A.
FIG. 15C is a sectional view taken along line D-D of FIG. 14.
Figure 16:
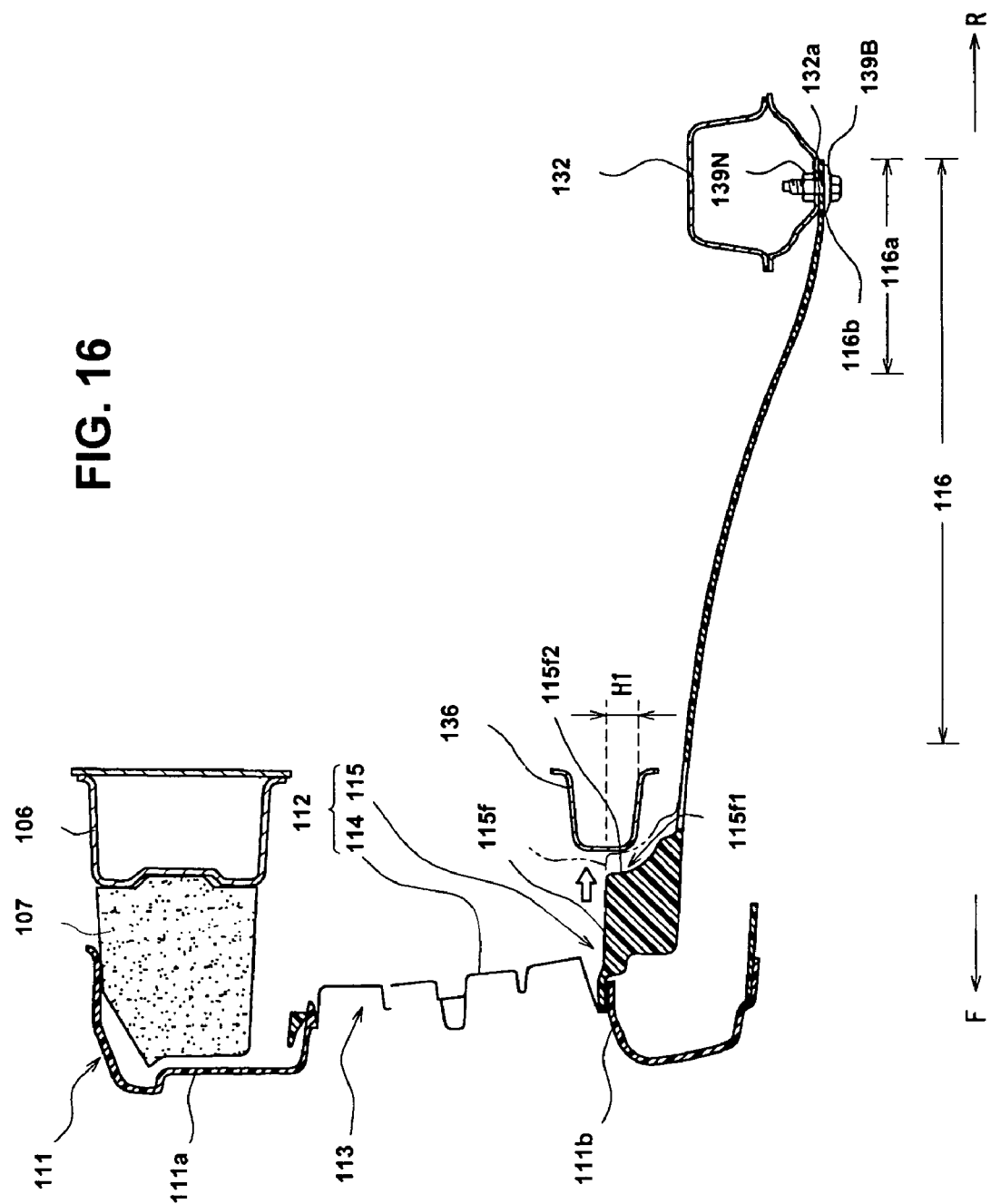
FIG. 16 is a sectional view showing a position relationship between a bumper face lower reinforcing portion and a second beam shown in FIG. 11.

A second embodiment will be described referring to FIGS. 11 to 16. FIG. 11 is a front perspective view showing a front structure of an automotive vehicle according to the second embodiment of the present invention. FIG. 12 is a sectional view taken along line A-A of FIG. 11. FIG. 13 is a side view showing the front structure of an automotive vehicle according to the second embodiment of the present invention. FIG. 14 is a rear perspective view showing a bumper mesh 112 of a bumper structure body 101. FIG. 15A is a sectional view taken along line B-B of FIG. 14, FIG. 15B is a sectional view taken along line C-C of FIG. 15A, and FIG. 15C is a sectional view taken along line D-D of FIG. 14. FIG. 16 is a sectional view showing a position relationship between a bumper face lower reinforcing portion 115 and a second beam 136 shown in FIG. 11. In the front structure of an automotive vehicle of the present embodiment, as shown in FIG. 11, there are mainly provided the bumper structure body 101, front side frames (front fames) 102 that are provided behind the bumper structure body 101 and extend in the longitudinal direction at both sides of the vehicle front portion, and a front sub frame 103. An arrow F in the figure shows a vehicle front direction and an arrow R shows a vehicle rear direction.

Below the front side frames 102 is provided a sub frame body that comprises a pair of side frames 131, 131 extending longitudinally, a front cross member 132 and a rear cross member 133, which extend laterally so as to interconnect respective front portions and rear portions of the side frames 131, 131. Herein, the both-side located front side frames 102 perform the same function respectively, and only one of them is illustrated in FIG. 11 for convenience.

Front end support portions 104a, 104a are provided at respective front end portions of the side frames 131, 131, and rear end support portions 104b, 104b are provided at respective rear end portions of the side frames 131, 131. Further, vertical members 134, 134 are provided at respective central portions of the side frames 131, 131 that are slightly before the rear cross member 133 so as to extend upward from the upper faces of the side frames 131, 131. At tip ends of these members 134, 134 are provided middle support portions 104c, 104c, respectively. These all support portions are supported at respective corresponding portions of the lower face of the front side frames 102, 102 via rubber bushes. Thereby, the front sub frame 103 is supported at the front side frames 102, 102 at six points.

In these support portions, for example, as shown in FIG. 12, the front end support portion 104a comprises an inner cylinder 141 that covers a bolt 121 projecting downward from an upper face of the front side frame 102, an outer cylinder 142 that is fixed to the side frame 131 (sub frame 103) via an outer face thereof, and a rubber 143 that is provided between the cylinders 141, 142. Thereby, the front sub frame 103 is resiliently supported at the front side frames 102 (vehicle body).

Herein, the side frames 131, 131 may not be necessarily supported at the front side frames 102, 102, but they may be supported at any other structure body having a body frame in the present invention.

Also, crush cans 135, 135 as the extension portions are attached to the front end portions of the side frames 131, 131 of the front sub frame 103 as shown in FIGS. 11 and 12. These crush cans 135, 135 are provided so as to extend forward from the front end portions of the side frames 131, 131 to be detachably attached to the side frames 131, 131 via connecting members such as bolts. The crush cans 135 perform as an impact absorption member so as to absorb the impact energy acting longitudinally by being crashed.

Herein, front end portions of the crush cans 135 are interconnected by the second beam (reinforcement) 136 that extends in the vehicle width direction right below a bumper beam 106 disposed at a front end of the front side frames 102 (see FIG. 16), which will be described below, which is disclosed, for example, in Japanese Patent Laid-Open Publication No. 2005-281810. The second beam 136 is disposed just behind the bumper structure body 101. The crush cans 135, 135 are made of a steel cylinder, and the second beam 136 is made from resin.

In FIG. 11, members 105a, 105b illustrated by two-dotted broken lines show two lower arms of a suspension mechanism. Specifically, as shown in FIG. 11, a front lower-arm support portion 137 is provided at an outside face of a rear portion of the side frame 131, and a rear lower-arm support portion 138 is provided at an outside face of a portion of the side frame 131 that is located behind the vertical member 134.

The front and rear lower arms 105a, 105b are pivotally supported at these support portions 137, 138, respectively, and a wheel support for supporting a front wheel (not illustrated) is pivotally supported at outside end portions of these lower arms 105a, 105b. Further, the wheel support is likewise supported at upper arms coupled to the front side frame 102, which are not illustrated in the figure. Thereby, the suspension mechanism is constituted.

Although the lower arms 105a, 105b are formed separately in the present embodiment, the lower arm may be comprised of a single A-shaped lower arm in which the both arms are integrated.

The bumper structure body 101, which is provided before the front side frames 102 and the front sub frame 103 as shown in FIG. 11, comprises mainly a bumper face 111 and the bumper mesh 112 and is attached to the vehicle front.

The bumper face 111, as shown in FIG. 13, comprises an upper portions 11a and a lower portion 111b that are located before the front side frames 102 and is integrally formed by an injection molding. A laterally-long opening portion 113 is formed between the upper portion 111a and the lower portion 111b. A grille-shaped mesh body 114 is attached to the opening portion 113 from the vehicle front side so as to allow an outside air into the opening portion 113.

A arc-shaped bumper face lower reinforcing portion 115 (hereinafter, referred to as "reinforcing portion 115") is provided inside of the lower portion 111b of the bumper face 111 so as to extend in a vehicle width direction. The bumper mesh 112 comprises the mesh body 114 located at the opening portion 113 and the above reinforcing portion 115.

According to the present embodiment, the reinforcing portion 115 and the mesh body 114 attached to the opening portion 113 are integrated, and FIG. 14 is a rear perspective view of those.

A lower edge portion of the mesh body 114 is connected to the reinforcing portion 115 via a down face 114a, and a plurality of engagement holes 114b are formed at the down face 114a.

An extension portion 116 is provided at the reinforcing portion 115 so as to extend rearward from a lower end of the reinforcing portion 115, bolt holes 116b, 116b are formed at the extension portion 116, and the extension potion 116 further includes two connection projection portions 116a, 116a that extend rearward at both sides thereof.

The extension portion 116 is formed in a rib shape so as to have a plurality of projection portions 116d that extend longitudinally. Thereby, it can provide a high rigidity against the impact load from the front at the vehicle hitting the pedestrian.

In the present embodiment, as described in detail below, the connection projection portions 116a, 116a of the extension portion 116 are a lower face of the front cross member 132 of the front sub frame disposed behind the lower portion 111b of the bumper face 111, whereby the reinforcing portion 115 is supported.

Another type of shape may be applied to the extension portion 116, not being limited to the above-described shape with the projection portions 116d. For example, a plurality of ribs extending slant are provided on the upper face of the extension portion 116, which provides a so-called honeycomb shape.

Hereinafter, the structure of the bumper structure body 101 will be described further referring to FIGS. 14 and 15.

In FIG. 14, a frame of the reinforcing portion 115 is comprised of side face portions 115a that extend rearward at both-side ends, an upper face portion 115b that extend forward (see FIG. 15), a front face portion 115c that extends downward from the upper face portion 115b (see FIG. 15), and a lower face portion 115d that extends rearward from the front face portion 115c. The reinforcing portion 15 further includes lateral ribs 115e that connect the side face portions 115a and extend rearward, and a plurality of vertical ribs 115f that connect the upper face portion 115b, front face portion 115c and lower face portion 115d so as to be located substantially perpendicularly to the lateral rib 115e. The vertical ribs 115f have recess portions 115f1 that are formed at upper side thereof as illustrated. Although two lateral ribs are provided in FIG. 15, a single lateral rib or three or more lateral ribs may be provided.

Front portions of the lateral and vertical ribs 115e, 115f are formed integrally with the front face portion 115c without projecting forward. Thereby, an improper concentration of an impact force at a tip portion of an impact absorption member at the vehicle hitting the pedestrian may be avoided, so that a damage against a hitting portion of the pedestrian can be properly reduced.

In the connection structure of the reinforcing portion 115a and the bumper face 111, as shown in FIG. 15A, plural thick portions 115g are provided at a rear portion of the lower face portion 115d of the reinforcing portion 115, which are connected to a rear end portion 111c via connection members 117. Thereby, the lower portion 111b of the bumper face 111 is supported at the front cross member 132 as well as the reinforcing portion 115 (see FIG. 11).

Herein, the lower face portion 115d of the reinforcing portion 115 that reaches the thick portion 115g has a reinforcing projection portion 115h that projects upward as shown in FIG. 15B. Namely, the lower face portion 115d has a cubic shape, in which that it has walls at its three sides in front of the thick portion 115g that is the connection portion to the rear end portion 111c of the bumper face 111. Thereby, it provides an efficiently strong structure against the hitting the pedestrian.

In a relationship between the upper portion of the rear end portion 111c of the lower portion 111b of the bumper face 111 and the reinforcing portion 115, no thick portion 115g is provided at the rear portion of the lower face portion 115d of the reinforcing portion 115 as shown in FIG. 15C, unlike FIG. 15A, and therefore it is not connected to the rear end portion 111c of the lower portion 111b of the bumper face 111. However, engagement holes 114b are formed at a down face 114a that is provided above the reinforcing portion 115 (see FIG. 14), and hook portions 111e extend rearward from the upper face portion 111d of the lower portion 111b of the bumper face 111 and go through the above engagement holes 114b. And, the hook portions 111e are formed at a rear end of the upper face portion 115b of the reinforcing portion and engaged with hook-engagement portions 115i of the lower face of the engagement holes 114b. Herein, the hook portion 111e may be formed up side down so that it is engaged with the mesh body 114.

Herein, the front sub frame 103 is disposed behind the lower portion 111b of the bumper mesh 111, and particularly as shown in FIG. 16, the second beam 136 is located so that a specified distance can be provided between the second beam 136 and the vertical rib 115f of the reinforcing portion 115. Further, the second beam 136 is located so that an vertical overlap distance H1 can be provided between its front end portion and the reinforcing portion 115.

Accordingly, since the second beam 136 is provided right behind the reinforcing portion 115 so that the second beam 136 and the reinforcing portion 115 overlaps each other, when the bumper structure body 101 receives the impact load from the front at the vehicle hitting the pedestrian, the vertical ribs 115*f* of the reinforcing portion 115 moving back contact the second beam 136, as shown by a two-dotted broken line in the figure, so the rearward impact from the front is conveyed to and received by the second beam 136 and thereby an improperly large rearward movement of the reinforcing portion 115 can be prevented surely. Accordingly, the prevention of dragging of the pedestrian can be further improved.

Further, since the reinforcing portion 115 is formed so as to be integral with the mesh body 114 and any particular connecting member such as the under cover, which may be necessary in the conventional structure disclosed in the above-descried patent publication, can be omitted in the present embodiment, the improvement of the dragging prevention of the pedestrian can be achieved without increasing the number of parts.

Also, the high-rigidity crush cans 135, 135 and the second beam 136, which may be provided to properly absorb the impact energy for a relatively small obstacle, are disposed behind the reinforcing portion 115 in the present embodiment. Thereby, the rearward movement of the reinforcing portion 115 can be more properly prevented than the structure using the under cover of the above-described patent publication.

The above-described patent publication just discloses the structure to improve the prevention of dragging of the pedestrian. The front structure of an automotive vehicle, however, may require not only the prevention of dragging of the pedestrian but the proper absorption of the impact energy at the vehicle frontal crash.

Accordingly, according to the present embodiment, the second beam 136 is provided, like the structure disclosed in Japanese Patent Laid-Open Publication No. 2005-281810. When the vehicle hits the relatively small obstacle, the impact load from the hitting of the obstacle is conveyed to the second beam 136 and the crush cans 135, 135 (see FIG. 11). These members are properly crashed with the load, absorbing the impact energy.

The second beam 136 is provided to extend in the vehicle width direction, so the impact load of the obstacle hitting a central portion between the both crush cans 135, 135 is conveyed to the crush cans 135, 135 and thereby the impact load can be properly reduced.

As described above, by the position relationship between the reinforcing portion 115 of the bumper structure body 101 and the second beam 136 of the front sub frame 103 (see FIG. 11), both the improvement of the dragging prevention of the pedestrian and the impact energy absorption of the obstacle hitting can be achieved.

Further, according to the present embodiment, the reinforcing portion 115 is provided at the bumper structure body 101, being separate from the front sub frame 103 (not directly attached to the front sub frame 103).

This is because the height of the front sub frame 103 is limited to a certain extent from the relationship with the front side frames 102 (see FIG. 11), while the height of the reinforcing portion 115 for the prevention of dragging of the pedestrian needs to be located at a level that is slightly lower than the second beam 136 (front sub frame 103) as shown in the figure.

Namely, in a case where the reinforcing portion 115 is attached to the second beam 136, the height of the second beam 136 is generally different from the proper height position of the reinforcing portion 115 for the dragging prevention as described above, so that a shape of the reinforcing portion 115 may become rather complicated. In this case, there is a concern that the rigidity of the reinforcing portion 115 would become improperly small according to its shape. According to the present embodiment, however, the reinforcing portion 115 is attached to the bumper structure body 101, so the reinforcing portion 115 can be positioned at the above-described preferable level regardless of the height of the second beam 136.

Also, the second beam 136 is configured to relatively move into the recess portion 115*f*1 of the vertical rib 115*f*. Thereby, since there can be a space behind the vertical rib 115*f* by the recess portion 115*f*1, the second beam 136 can be located as forward as possible.

Herein, the longitudinal length of the crush cans 135, 135 is generally decided considering the proper impact energy absorption, and it is preferable that second beam 136 be located as forward as possible to ensure this longitudinal length. Also, even if the part of the vertical rib 115*f* is cut away, this may not cause any improper influence on the dragging prevention of the pedestrian. Thereby, according to the present embodiment, the second beam 136 can be located as forward as possible by forming the recess portion 115*f*1 at the vertical rib 115*f*, maintaining the proper dragging prevention of the pedestrian, so that the sufficient length of the crush cans 135, 135 can be ensured and the impact energy absorption can be improved.

Further, at the recess portion 115*f*1 is provided an upright face 115*f*2 that extends substantially vertically facing a front end portion of the second beam 136. Thereby, as shown by the two-dotted broken line, when the vertical rib 115*f* of the reinforcing portion 115 contacts the second beam 136 and even if the load is further applied from the front, the vertical rib 115*f* can be prevented from sliding on the front face portion of the second beam 136 and moving rearward passing through the second beam 136. Accordingly, the rearward movement of the reinforcing portion 115 can be surely prevented.

Also, in order to prevent the rearward movement of the reinforcing portion 115, as described above, the extension portions 116 are connected to the lower face of the front cross member 132 at the connection projection portions 116*a*, 116*a* via bolts 139B and nuts 139. Specifically, the bolts 139B are inserted into the bolt holes 116*b* of the connection projection portions 116*a* and bolt holes 132*a* that are formed at the lower face of the front cross member 132, and fastened with the nuts 139N. Thereby, the proper relative position between the reinforcing portion 115 and the second beam 136 can be maintained, so a deterioration of the dragging prevention of the pedestrian can be avoided properly.

Herein, since the both-side connection projection portions 116*a*, 116*a* are located apart from each other in the vehicle width direction of the extension portion 116, the support of the reinforcing portion 115 at the front cross member 132 can be more stable compared to a case where the connection portions are located near the center.

Also, since the projection portions are formed on the surface of the extension portion 116, the properly high rigidity against the impact load from the front at the hitting the pedestrian can be provided.

Herein, members 106, 107 that are located inside the upper portion 11*a* of the bumper face 111 in FIG. 16 are a bumper beam and an energy absorption member, respectively. The bumper beam 106 is attached to a bumper bracket (not illustrated) at a front end of the front side frame 102.

The bumper beam 106, which extends in the vehicle width direction, has the energy absorption member 107 at its front. The energy absorption member 107, which extends in the vehicle width direction along a longitudinal direction inside the bumper face 111, is positioned at a level that is almost equivalent to the height of knees of the pedestrian. Herein, the energy absorption member 107 is made of an EA foam (energy absorber foam) such as urethane.

Embodiment 3

Figure 17:
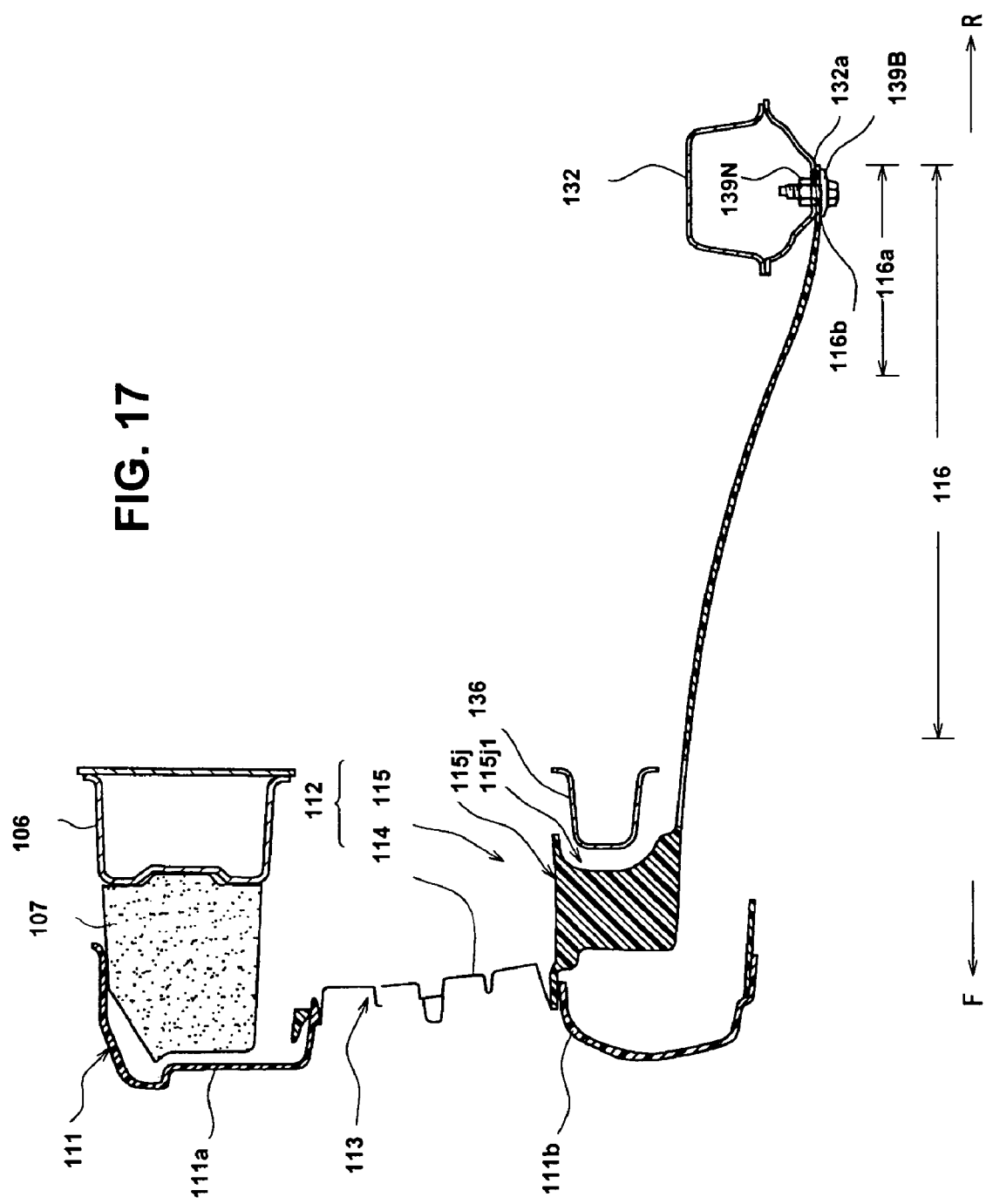
FIG. 17 is a sectional view showing a position relationship between a bumper face lower reinforcing portion and a second beam of a front structure of an automotive vehicle according to a third embodiment of the present invention.

Hereinafter, a third embodiment will be described referring to FIG. 17. FIG. 17 is a sectional view showing a position relationship between the reinforcing portion 115 and the second beam 136. Herein, the same components of the second embodiment are denoted by the same reference characters, whose descriptions are omitted.

In the above-described second embodiment, the vertical rib 115f of the reinforcing portion 115 and the second beam 136 overlaps each other so as to have the vertical overlap distance H1, and the second beam 136 has its open upper portion. Meanwhile, in a case where the opening portion 113 has a shorter vertical length and instead the lower portion 111b of the bumper face 111 has a longer vertical length, the third embodiment comprises a vertical rib 115j that has a recess portion 115j1 enclosing the whole front end portion of the second beam 136 including its upper portion, as shown in FIG. 17.

Thereby, the possibility of the vertical rib 115f moving rearward sliding on the front face portion of the second beam 136 can be reduced further compared to the vertical rib 115f of the second embodiment, so that the rearward movement of the reinforcing portion 115 can be surely prevented.

Embodiment 4

Figure 18:
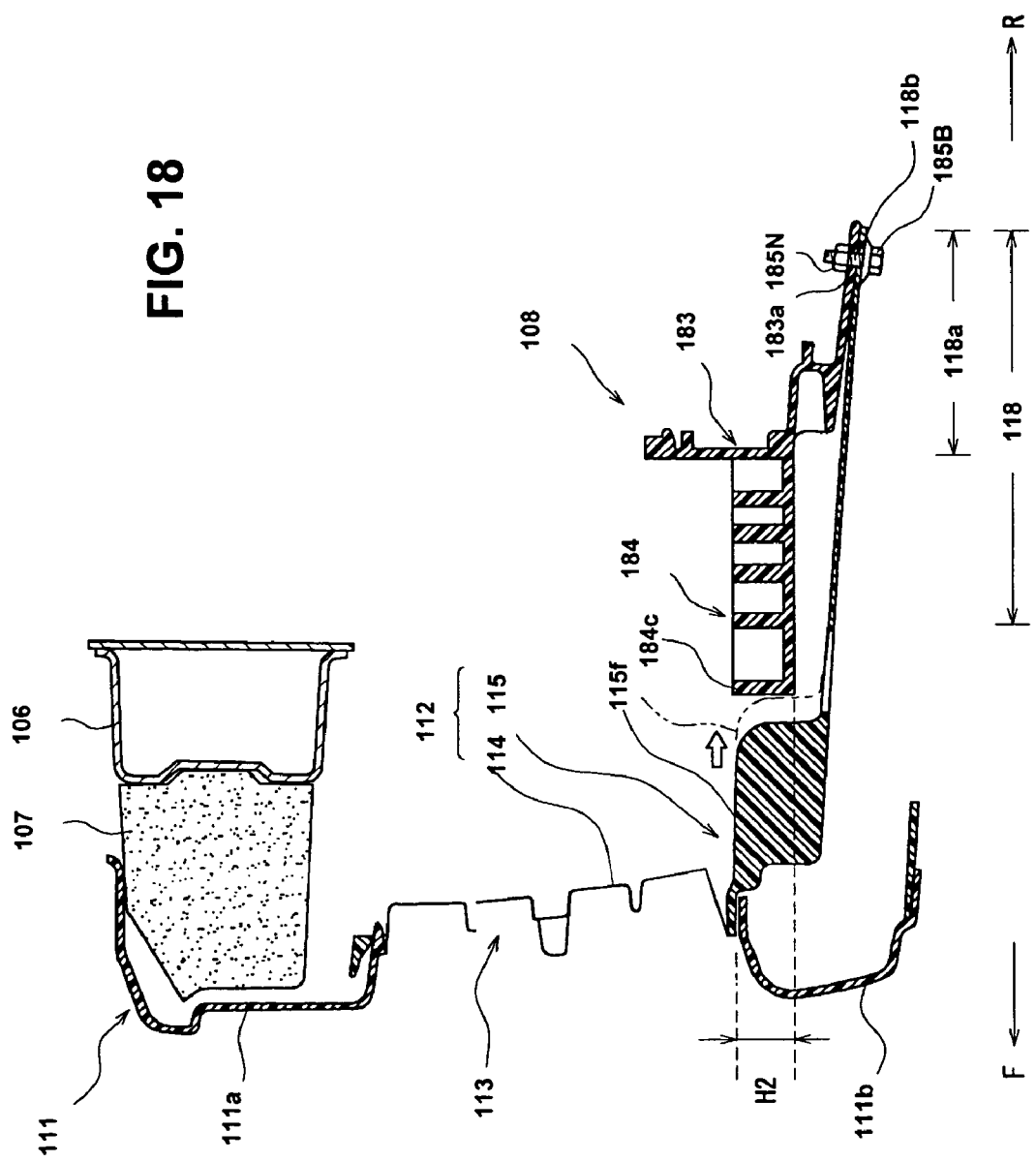
FIG. 18 is a sectional view showing a position relationship between a bumper face lower reinforcing portion and a forward extension portion of a shroud of a front structure of an automotive vehicle according to a fourth embodiment.
Figure 19:
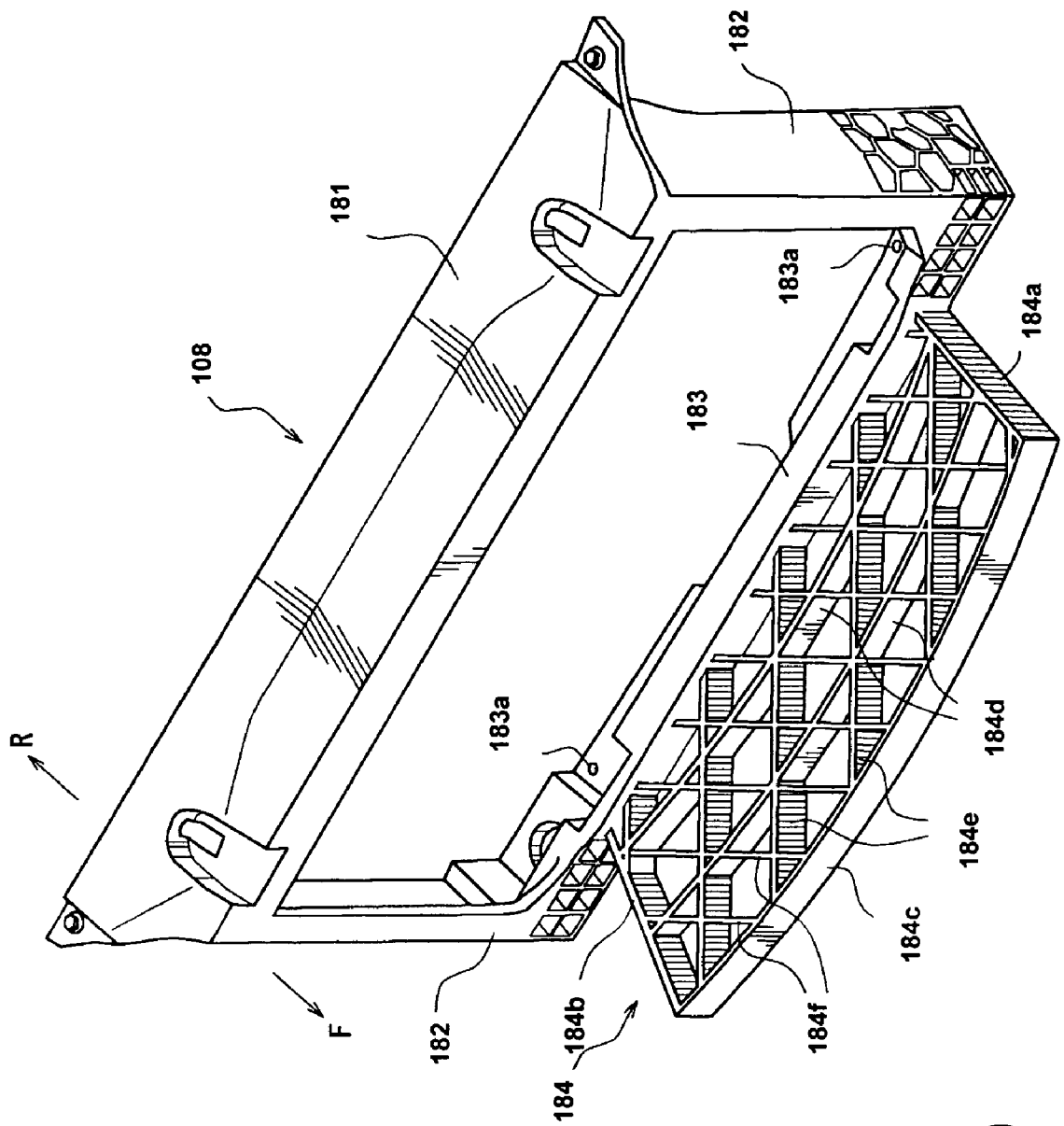
FIG. 19 is a front perspective view of showing a structure of the shroud.
Figure 20:
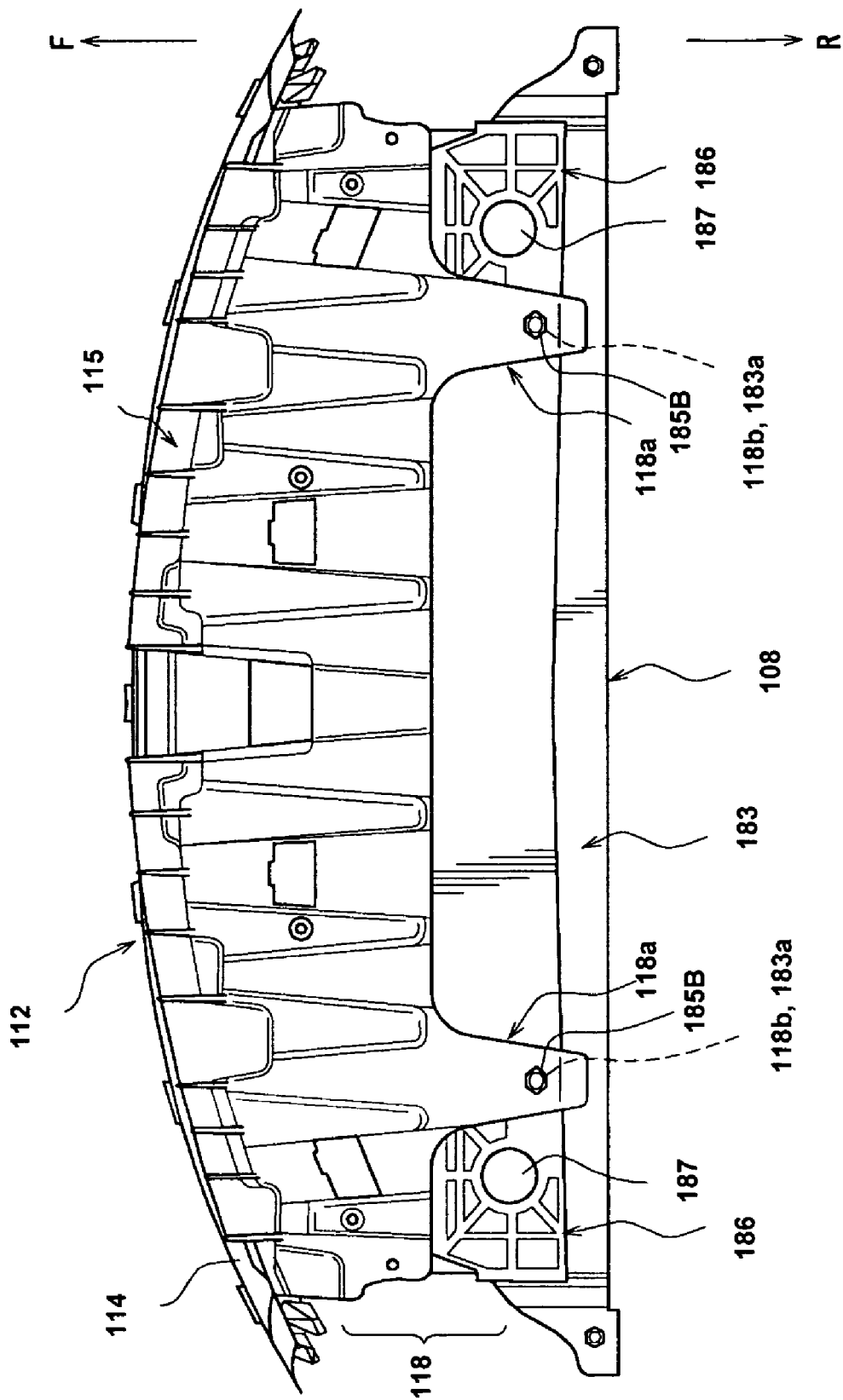
FIG. 20 is a bottom view showing a connection state of a rearward extension portion of a bumper face lower reinforcing portion and a shroud.
Figure 21:
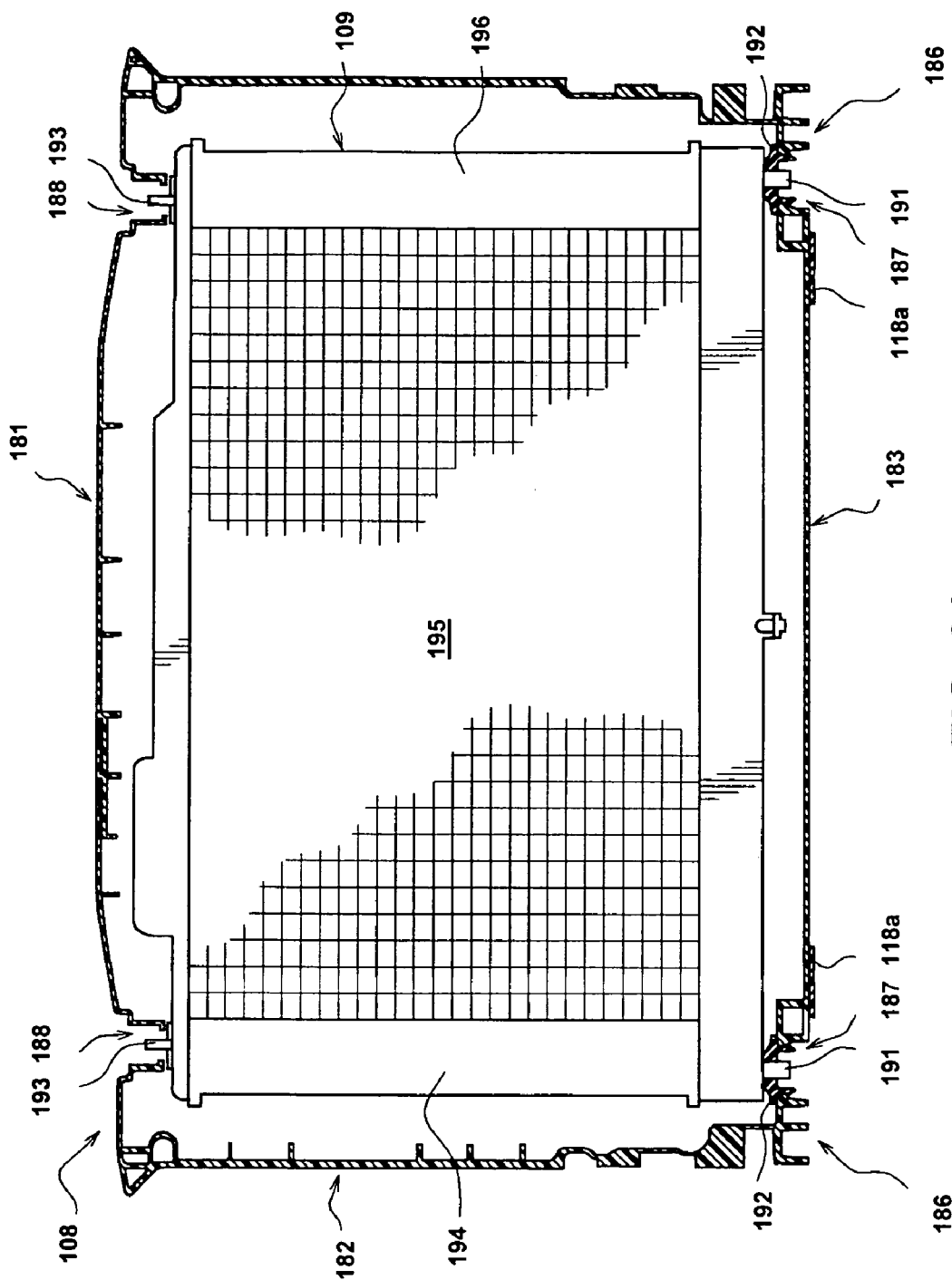
FIG. 21 is a sectional view showing an assembly state of a radiator to the shroud.

Hereinafter, a fourth embodiment will be described referring to FIGS. 18 to 20. FIG. 18 is a sectional view showing a position relationship between the bumper face lower reinforcing portion 115 and an forward extension portion 184 of a shroud 108 of a front structure of an automotive vehicle according to the fourth embodiment. FIG. 19 is a front perspective view of showing a structure of the shroud 108. FIG. 20 is a bottom view showing a connection state of a rearward extension portion 117 of the reinforcing portion 115 and the shroud 108. FIG. 21 is a sectional view showing an assembly state of a radiator 109 to the shroud 108. Herein, the same components of the second embodiment are denoted by the same reference characters, whose descriptions are omitted.

Although the rearward movement of the reinforcing portion 115 of the second and third embodiments is mainly prevented by the second beam 136 of the front sub frame 103, the shroud 108 that is disposed behind the bumper face 111 mainly prevents the rearward movement of the reinforcing portion 115 as shown in FIG. 18 in the fourth embodiment. Herein, the upper portions 111a, 111b of the bumper face 111 are disposed in front of the front side frames 102 (see FIG. 20) like the second embodiment, whose illustration is omitted.

The shroud 108, which is of substantially a rectangular shape and made from resin, mainly comprises an upper portion 181, side portion 182 and lower portion 183, and has the forward extension portion 184 integrally formed at the front thereof that extends forward from the lower portion 183 substantially horizontally, as shown in FIG. 19.

The forward extension portion 184 comprises frame portions 184a, 184b, 184c that form three sides of a right, left and front sides of the portion 184, lateral ribs 184d that are provided at intervals in the longitudinal direction between the lateral frame portions 184a, 184b, and a plurality of ribs 184e, 184f that extend slant among the frame portions 184a, 184b, 184c. All these portions are integrally formed of resin, and this forward extension portion 184 is a resin structure body (honeycomb structure body) having substantially an arc shape, when viewed from the above. A load characteristics of this resin structure body can be adjusted by properly designing the thickness, density or extension direction of the frame portions 184a, 184b, 184c or the ribs 184d, 184e, 184f.

The shroud 108 is disposed right behind the reinforcing portion 115 in such a manner that a specified distance is provided between the front frame portion 184c and the vertical rib 115f of the reinforcing portion 115, like the second and third embodiments.

Further, the forward extension portion 184 is located so that the frame portion 184c has a vertical overlap distance H2 with respect to the reinforcing portion 115.

Originally, the shroud 108 is a member to support the radiator 109 (see FIG. 20), and has a higher rigidity than that of the bumper mesh 112. Accordingly, the forward extension portion 184 integrally formed with the lower portion 183 of the shroud 108 has also a high rigidity, and thereby the rearward movement of the reinforcing portion 115 can be more surely prevented than the structure using the under cover of the above-described patent publication.

Accordingly, since the forward extension portion 184 is integrally formed with the lower portion 183 of the shroud 108 so as to extend forward near the reinforcing portion 115, when the bumper structure body 101 receives the impact load from the front at the vehicle hitting the pedestrian, the vertical ribs 115f of the reinforcing portion 115 moving back contact the frame portion 184c of the forward extension portion 184, as shown by a two-dotted broken line in FIG. 18, so the rearward impact from the front is conveyed to and received by the shroud 108 and thereby an improperly large rearward movement of the reinforcing portion 115 can be prevented surely. Accordingly, the prevention of dragging of the pedestrian can be further improved at the vehicle hitting the pedestrian.

Herein, the impact force at the vehicle hitting the pedestrian acts on the front portions of the lateral and vertical ribs 115e, 115f of the reinforcing portion 115, not on the hard shroud 108. Thereby, as described in the second embodiment, the improper concentration of the impact force at the tip portion of the impact absorption member at the vehicle hitting the pedestrian may be avoided, so that the damage against the hitting portion of the pedestrian can be properly reduced.

Further, the forward extension portion 184 is integrated with the lower portion 183 of the shroud 108, and the reinforcing portion 115 is integrated with the mesh body 114, and thereby any particular connecting member such as the under cover, which may be necessary in the conventional structure disclosed in the above-descried patent publication, can be omitted in the present embodiment as well. Thus, the improvement of the dragging prevention of the pedestrian can be achieved without increasing the number of parts.

Since the forward extension portion 184 is formed in the honeycomb structure as described above, the rigidity of the forward extension portion 184 can be increased without providing any additional reinforcing member. Thereby, the rearward movement of the reinforcing portion 115 can be prevented more surely even when the impact load is applied from the front.

Also, in order to prevent the rearward movement of the reinforcing portion 115 surely, as shown in FIGS. 18 and 20, at the reinforcing portion 115 are provided rearward extension portions 118 that extend rearward from the lower end thereof, and the rearward extension portions 118 are connected to the lower portion 183 of the shroud 108 via bolts 185B and nuts 185N. Specifically, connection projection portions 118a, 118a are provided at both sides of the rearward extension portion 108, and these connection projection portions 118a, 118a are connected to both-side portions of the lower portion 183 of the shroud 108. The bolts 185B are inserted into bolt holes 118b of the connection projection portions 118a and bolt holes 183a that are formed at the lower face of the lower potion 183, and fastened with the nuts 185N.

Thereby, the proper relative position between the reinforcing portion 115 and the forward extension portion 184 can be maintained, so a deterioration of the dragging prevention of the pedestrian can be avoided properly.

Herein, since the both-side connection projection portions 118a of the rearward extension portion 118 are located apart from each other in the vehicle width direction, the support of the bumper mesh 112 including the reinforcing portion 115 at the shroud 108 (lower portion 183) can be more stable compared to a case where the connection portions are located near the center.

Herein, in the case of the present embodiment in which the shroud 108 is made from resin, as shown in FIG. 21, there are provided support portions 186 having a rib shape with many projections, whose sectional rigidity is higher than that of other portions, at the lower face of the lower portion 183 of the shroud 108. Thus, the above-described connection projection portions 118a of the present embodiment are connected to portions adjacent to these support portions 186.

A through hole 187 is formed at a center of each of the support portions 186, and a shaft member 191, which is fixed to a lower portion of the radiator 109 as a heat exchanger, is inserted into each through hole 187 as shown in FIG. 21. Thereby, the radiator 109 is resiliently mounted on the lower portion 183 of the shroud 108 via a mount rubber 192 attached to each shaft member 191, which is not illustrated in FIG. 19.

The radiator 109 has shaft members 191 at its upper portion that extend upward respectively so as to correspond the above-described shaft members 193. The shaft members 193 are provided so as to be inserted into through holes 188 that are formed at the upper portion 181 of the shroud 108.

Herein, the conventional type of radiator 109, which has a side tank 194 and a radiator core 195 at one side and a side tank 196 on the other side, is applied in the present embodiment.

Thereby, since the radiator 108 is supported at the strong support portions 186 of the lower portion 183 of the shroud 108, the proper support of the radiator 109 is provided.

Further, according to the present embodiment, the connection projection portions 118a of the rearward extension portions 118 are connected the portions near the support potions 186, so the support rigidity of the bumper mesh 112 including the reinforcing portion 115 can be improved without providing any particular reinforcing portion.

Herein, the extension is the crush cans 135, and the recess portion is the recess portions 115f1, 115f1.

The present invention should not be limited to the above-described embodiments, and any other modifications and improvements may be applied within the scope of a sprit of the present invention.

What is claimed is:

1. A front structure of an automotive vehicle having a radiator, comprising:
  a bumper face including an upper portion and a lower portion, an opening portion being formed between the upper and lower portions;
  a shroud provided behind said lower portion of the bumper face, the shroud being made from resin and including an upper portion, a side portion and a lower portion; and
  a bumper mesh including a mesh body that is located at said opening portion of the bumper face, a bumper face lower reinforcing portion that is located inside of said lower portion of the bumper face and connected to a lower end of said lower portion of the bumper face, and an extension portion that extends rearward from a lower end of the bumper face lower reinforcing portion,
  wherein said shroud has a radiator-support portion to support the radiator at both side portions of the lower portion thereof, the radiator-support portion having a section rigidity that is greater than that of any other portion of the shroud, and
  said extension portion of the bumper mesh is connected to the lower portion of said shroud near the radiator-support portion.

2. The front structure of an automotive vehicle of claim 1, wherein said extension portion of the bumper mesh is connected to a lower face of the lower portion of the shroud, and at substantially a central portion of the extension portion is provided a projection portion that projects upward from the lower face of the lower portion of the shroud and extends longitudinally.

3. The front structure of an automotive vehicle of claim 2, wherein at said lower portion of the shroud is provided a protrusion portion that protrudes forward at a location above the lower face of the lower portion of the shroud, and said projection portion is connected to a lower face of the protrusion portion.

4. The front structure of an automotive vehicle of claim 1, wherein at both-side portions of said extension portion are provided guide portions for assembling that extend obliquely downward from behind the connection portion to the lower portion of the shroud.

5. The front structure of an automotive vehicle of claim 1, wherein there are provided front side frames that are provided at both sides of a vehicle front so as to extend in a longitudinal direction, and a sub frame that includes a sub frame body portion, which is provided behind the lower portion of the bumper face and below the front side frames, extension portions, which extend forward from both-side front ends of the sub frame body portion and have a rigidity that is greater than that of the bumper mesh, and a beam portion, which is located behind said bumper face lower reinforcing portion so as to interconnect the extension portions and have a rigidity that is greater than that of the bumper mesh, and said sub frame is disposed in such a manner that the beam portion thereof and the bumper face lower reinforcing portion overlaps each other.

6. The front structure of an automotive vehicle of claim 5, wherein a recess portion is provided at a rear portion of said bumper face lower reinforcing portion, and said beam portion of the sub frame is configured to relatively move into the recess portion of the bumper face lower reinforcing portion.

7. The front structure of an automotive vehicle of claim 6, wherein at said recess portion is provided an upright face that extends substantially vertically facing a front end portion of said beam portion of the sub frame.

8. The front structure of an automotive vehicle of claim 5, wherein said sub frame body portion includes a front cross member that is located behind the beam portion so as to extend in a vehicle with direction, and said extension portion of the bumper mesh is connected to said front cross member.

9. The front structure of an automotive vehicle of claim 8, wherein said extension portion has a plurality of projection portions along a vehicle width direction that extend substantially longitudinally.

10. The front structure of an automotive vehicle of claim 5, wherein behind the bumper face is provided a shroud that includes an upper portion, a side portion and the lower portion and is made from resin that has a rigidity that is greater than that of a material of said bumper mesh, and at the lower portion of the shroud is provided a forward extension portion, a front end of which extends near said bumper face lower reinforcing portion.

11. The front structure of an automotive vehicle of claim 10, wherein said forward extension portion has a plurality of ribs.

12. The front structure of an automotive vehicle of claim 1, wherein a lower face portion of the bumper face lower reinforcing portion of said bumper mesh is connected to a rear end portion of said bumper face via a connection member.

13. The front structure of an automotive vehicle of claim 1, a cross member that extends in a vehicle width direction is provided behind said shroud.

* * * * *